United States Patent [19]

Fine

[11] Patent Number: 4,894,846
[45] Date of Patent: Jan. 16, 1990

[54] METHOD FOR MAINTAINING A CORRECT TIME IN A DISTRIBUTED PROCESSING SYSTEM

[75] Inventor: Michael Fine, Cambridge, Mass.

[73] Assignee: Digital Equipment Corporation, Maynard, Mass.

[21] Appl. No.: 213,746

[22] Filed: Jun. 30, 1988

[51] Int. Cl.⁴ .............................................. H04L 7/04
[52] U.S. Cl. .................................... 375/107; 370/103; 375/109
[58] Field of Search ................... 331/1 A, 18; 370/60, 370/100, 103, 104; 328/155; 455/51, 69; 375/106, 107, 109; 364/132, 138, 580; 368/46, 47, 55; 340/825.14, 825.20, 825.21

[56] References Cited

U.S. PATENT DOCUMENTS

| | | |
|---|---|---|
| 4,530,091 | 7/1985 | Crockett ............................... 370/60 |
| 4,551,833 | 11/1985 | Turner .................................. 370/60 |
| 4,677,614 | 6/1987 | Circo ................................... 375/107 |
| 4,746,920 | 5/1988 | Nellen et al. ......................... 375/107 |

Primary Examiner—Benedict V. Safourek
Attorney, Agent, or Firm—Finnegan, Henderson, Farabow, Garrett and Dunner

[57] ABSTRACT

A method for maintaining a correct time in a distributed processing system involves clerk nodes maintaining their local clocks by requesting time intervals from server nodes, and server nodes maintaining their local clocks either by requesting time intervals from other server nodes or by receiving time information from an outside source. Server nodes also provide time intervals to requesting clerk nodes and requesting server nodes with such a method. System time is always increasing and monotonic and faulty servers are detected periodically.

43 Claims, 19 Drawing Sheets local time 1 (Node A): Copy file 1 to file 2 local time 2 (Node B): Copy file 3 to file 1

Before local time 2 (Node B): Copy file 3 to file 1

Results After Step 1 local time 1 (Node A): Copy file 1 to file 2

Results After Step 2

Adjust Clk-Start

Adjust Clk-End

Performed by Clerk

Compute Correct Time Interval

Finding Minimum Endpoint of Correct Time Interval

Adjustment of a Local Clock for Leap Seconds

Performed by Server

Time Maintainer Manual Reset

Detecting Faulty Server Nodes

METHOD FOR MAINTAINING A CORRECT TIME IN A DISTRIBUTED PROCESSING SYSTEM

BACKGROUND OF THE INVENTION

The present invention relates to distributed processing systems, and specifically to a method of maintaining a correct time in a plurality of nodes of a distributed processing system.

(A) GENERAL NETWORK OVERVIEW

Some distributed data processing systems are configured as Local Area Networks (LAN's) having multiple nodes connected together for passing information back and forth. One such distributed data processing system network 29 is shown in FIG. 1. The network consists of multiple nodes 30 which pass information along connecting lines 32. The connecting lines 32 may be twisted-pair wires, coaxial cables, or the like. The nodes 30 may be any of various types of devices hooked to the network, such as VAXclusters provided by Digital Equipment Corporation, microcomputers, intelligent workstations, mainframe computers or the like.

All nodes in the network 29 contain software responsible for organizing and coordinating the flow of information between the nodes. One type of such software is dedicated to the mechanics of establishing a signal connection between nodes, of transmitting information between nodes, and of ending the connection when the information transmittal is complete. Such software operates according to one of a variety of communication protocols, such as Digital Network Architecture (DNA) or Open System Interconnection (OSI), which are well known in the art and will not be described herein.

A second type of software in the nodes is dedicated, not to the mechanics of information transmittal, but to generating the information being transmitted, i.e., to application programs. Examples of application programs include word processors, mail programs, data base managers, etc.

A third type of software in the nodes provides an easy-to-use interface between the application programs and various other hardware or software. Software programs of this third type are called "clerks," "clerk software," or "clerk programs" because they handle the details of information transfer for the application programs. Application programs interfacing with clerks are called "clients," "client software," or "client programs" because the application programs are being served by the clerks. Nodes containing clerk software are called clerk nodes.

FIG. 2 shows a clerk program 40 in a memory 44 of a node 41. Clerk program 40 provides an interface between the network via lines 32 and an application program 42, which is also in memory 44 of node 41. Clerk program 40, which is executed by a processor 46 in the node 41, transmits and receives information to and from network 29 via lines 32. Clerk program 40 communicates with application program 42 via locations (not shown) in memory 44 under control of application program 42. Many types of clerk programs similar to clerk program 40 may exist to handle the various needs of application programs.

FIG. 2 also shows a local clock 48 of node 41. Local clock 48 is incremented regularly (if it is digital) or increased at a regular rate (if it is analog) to keep what is called "local time" for node 41. This incrementing is accomplished by an increment circuit 49. Local clock 48 is accessed, i.e., set and read, by clerk program 40 in node 41. Clerk program 40 also serves as an interface to local clock 48 for application program 42. Thus, clerk program 40 of FIG. 2 is called a "time service" clerk because it services requests for the local time from application program 42.

As shown in FIG. 2, not all application programs interface to the network via clerks. Some application programs, such as an application program 50 of FIG. 2, handle their own network communications yet still access clerk program 40 to obtain the local time.

Several methods exist for controlling the communication of information between the nodes 30. For example, the network of FIG. 1 uses a method called "carrier-sensing multiple access with collision detection" (CSMA/CD) as defined in IEEE Standard 802.3. Under CSMA/CD, all nodes on the network are of equal importance. A node 30 can "send" information on the network only when no other node is trying to send information. If a node tries to send information at the same time that another node is also trying to send information, each node will wait a randomly-determined period of time and then attempt to resend its information. Since the period of time each node waits before attempting a resend is randomly determined, it is probable that both resends will be successful. Every node On the CSMA/CD network "listens" to all information sent over the network. If any node "sees" information intended for that node, the node will receive the information and take appropriate action. Information passing between the nodes of the network is organized into packets. Each packet contains data or control information surrounded by control and routing information.

Network 29 of FIG. 1 operates using the Ethernet standard for data transmission. This standard governs the protocol used in transmitting data at a low conceptual level. It is compatible with the OSI and DNA communications protocols.

Packets on an Ethernet network may be sent using one of two basic methods: unicasting and multicasting. In unicasting, a packet is sent from a first node to a second node. The destination address field of the packet indicates that the packet is destined for a single node. In multicasting, a single node broadcasts information to multiple nodes and the destination address field of the packet indicates that the packet is destined for a group of nodes.

(B) REPRESENTATION OF TIME IN A DISTRIBUTED PROCESSING SYSTEM (i) Notation

An abstract notion of time is defined by some standard which provides a frame of reference by which all values of time are related. One such standard is Universal Coordinated Time (UTC), an international standard maintained by the International Time Bureau (BIH) and the one in general use throughout the world. Political representations of UTC (such as Eastern Standard Time (EST) or Pacific Daylight Time (PDT)) are functionally equivalent to UTC. A clock is simply a device that provides a measure of UTC. The UTC time standard runs at a rate that is almost constant since it is based on ultra-stable atomic clocks. However, some users of time signals need time that is referenced to the rotation of the earth. This time standard is known as UT1 and is inferred from astronomical observations. To keep UTC and UT1 approximately equal, occasional corrections of exactly one second—called "leap" seconds—are inserted into the UTC time scale when necessary.

In order to quantify how well a clock is measuring UTC, it is important to define the concept of "correct" time. Let $C_i$ denote a local clock in an ith node of network 29 and let $C(i,t)$ represent the value of $C_i$ at the time t. (Throughout this specification, times denoted by t refer to UTC). In order to quantify how well a clock is measuring UTC, we introduce several properties of Clocks. Most important of these is the property of correctness. The following definitions will be used throughout the remainder of the specification:

Inaccuracy: A perfect clock is one where $C(i,t)=t, \forall\ t$. However, a real clock always introduces some error. The inaccuracy of $C_i$ at time t, denoted by $\alpha(i,t)$, is defined as the deviation of $C_i$ from UTC. Hence, $$\gamma(i,t) = C(i,t) - t.$$

Drift: The rate of change of inaccuracy is called the drift and for $C_i$ of an analog clock is given by:

$$\delta(i,t) = dC(i,t)/dt - 1.$$

$C_i$ of a digital clock is given by:

$$|C(i,t+\Delta t) - C(i,t) - \Delta t| < \delta \Delta \delta idt$$

for some interval $\Delta t$.

Monotonicity: A clock is said to be monotonic if its measure of time is never decreasing, i.e., if $$C(i,t_2) > C(i,t_1) \text{ for } t_2 > t_1.$$

Resolution: The resolution of a clock is the maximum time interval that can elapse without there being any change in the value of the clock. The resolution is denoted by p.

Skew: For two clocks i and j, the skew at time t is given by $$\sigma ij(t) = |C(i,t) - C(j,t)|.$$

Correctness: For complete time information, it is not sufficient to supply only the time $C(i,t)$. The inaccuracy must be represented as well. Suppose that a clock reports a positive inaccuracy $I(i,t)$ with the value of time $C(i,t)$. For this combination of time and inaccuracy to be correct, we require that $I(i,t) \geq |\gamma(i,t)|$ meaning that $$C(i,t) - I(i,t) < t < C(i,t) + I(i,t).$$

Time at clock i can be represented as an interval $W(i,t) = [C(i,t) - I(i,t), C(i,t) + I(i,t)]$. As shown in FIG. 3, for an arbitrary interval $V = [x,y]$, we define $\underline{|V|} = x$; $\overline{|V|} = y$, $\|V\| = (x+y)/2$ (the midpoint of the interval); and $|V| = y - x$ (the width of the interval).

Using interval notation, the inaccuracy is given by $I(i,t) = |W(i,t)|/2$. A time interval is said to be correct if $\underline{|W(i,t)|} \leq t \leq \overline{|W(i,t)|}$, i.e., the interval contains UTC. A set of M local clocks is said to be synchronized if the clocks intervals overlap, i.e., $W(1,t) \cap W(2,t), \ldots, W(M,t) \neq 0$. If the clocks are correct, they must be synchronized.

Next, some notation for interval arithmetic is defined. The sum of two intervals is defined as $[x,y] + [u,v] = [x,u, y+v]$. The sum of an interval and a scalar is identical to the sum of two intervals, one of which has width zero. Thus $[x, y] + z = [x,y] + [z,z] = [x+z, y+z]$. This sum is equivalent to translating the interval along the real line. The notation $[x, y] \pm z$ denotes a "stretching" of the interval, i.e., $[x, y] \pm z = [x-z, y+z]$.

(ii) Clocks

Two basic types of clocks exist: clocks that obtain time from an external source, such as radio signals, and clocks that are self-contained, such as crystal clocks. Clocks of the first type measure UTC with a known bound on the inaccuracy which depends on the propagation delay of the radio signal and implementation specific details. If operating correctly, the time and inaccuracy reported by clocks of the first type define an interval that contains the instantaneous value of UTC. Clocks of the second type supply the time in the form of a scalar and there is no inherent notion of inaccuracy. However, clocks of the second type do have bounds on their drifts, which is denoted by $\delta$ max. So, given an initial inaccuracy $I_i$ at time $T_i$, it is possible to compute the inaccuracy at the time that the clock reads T from $I \leq I_i + (T - T_i)\delta$max. Thus a self-contained clock can represent time as an interval but this interval increases or "degrades" as time progresses.

In previously existing systems, no provision was made for adjusting the time of a local clock except by resetting it with a new value. As a result, the time could jump forward or backward arbitrarily. Such quantum jumps in local time sometimes resulted in events having an ordering by UTC such as shown in FIG. 4a being timestamped to reflect a different ordering such as shown in FIG. 4b.

(C) USES OF TIME IN A DISTRIBUTED PROCESSING SYSTEM

Time, in a data processing system, is used in at least three ways. A first use is to time and order events. In many processes performed by data processing systems (for example, event logging), it is desirable to be able to determine an order of occurrence for several events. A second use for time in a data processing system is to determine an interval of time that has elapsed between two events. Examples include system timeouts, Ethernet packet lifetimes, and I/O timeouts. A third use for time in a data processing system is to schedule future execution of events. If an event is to begin execution at a time near a scheduled time, an inaccuracy of the clock must be known and bounded within certain predetermined limits.

Early data processing systems were centralized mainframe computers and usually maintained a time via a single system clock integral to the system. Various operating system and application programs executed on the centralized system and accessed the system clock when they needed a current time value. An error in the time kept by the system clock wax discovered by human inspection and remedied simply by manually resetting the system clock whenever the error in its time exceeded some predetermined error limit. For example, the local clock of a VAX data processing system, manufactured by Digital Equipment Corporation, may drift by as much as nine seconds a day. This could cause a drift of as much as 3285 seconds (54.75 hours) per year. Such errors, while inconvenient are easily detected and do not usually cause a major problem for a centralized data processing system. Although such errors cause the time kept by the system clock to deviate from UTC, the time is still increasing and monotonic because the system contains only a single clock Thus, events will still be ordered correctly and time intervals and timeouts, while perhaps of slightly incorrect duration, will still be correct relative to other intervals and timeouts in the system. Events may be timestamped incorrectly in relation to UTC, but their ordering will not be altered.

In contrast, disagreement between the local clocks in the nodes of a distributed processing system, such as the network of FIG. 1, can cause catastrophic errors in the system. Assume, for example, that both node A and node B of FIG. 1 contain a local clock keeping a local time. A difference in the times kept by the clocks of the two nodes may cause a distributed software process to produce erroneous results.

In FIGS. 5a-5f, node A and node B of a distributed processing system are to perform different steps of the following process at UTC times time1 and time2, respectively,
UTC time1: copy file1 to file2 (by node A)
UTC time2: copy file3 to file1 (by node B)
where UTC time1 precedes UTC time2. In this algorithm, the order of performance of the steps is critical.

If, as shown in FIG. 5a, the clocks of both nodes A and B are keeping local times that are the same as UTC, the copy from file1 to file2 is performed first (by node A at node A's local time1) and the copy from file3 to file1 is performed second (by node B at node B's local time2). This is the desired order of performance, yielding the results labeled "Results after Step 2" in FIG. 5b.

If, however, the local clock of node B is keeping incorrect time, erroneous results may occur. If, as shown in the timing diagram of FIG. 5c, the local clock of node B is being incremented more frequently than the local clock of node A, then the local clock of node B may reach a local time2 before the local clock of node A reaches a local time1. Similarly, as shown in the timing diagram of FIG. 5d, the local clock of node B may have been mis-set at some previous time. Therefore, even though the local clock of node B is being incremented at correct intervals, local time2 of node B precedes local time1 of node A. Alternately, as shown in the timing diagram of FIG. 5e, the amount by which the local clock of node B is being incremented may be larger than the amount by which the amount by which node A is being incremented. Again, such a condition will cause local time2 of node B to precede local time1 of node A.

If any of the conditions of FIGS. 5c, 5d, or 5e exist, the copy from file3 to file1 is performed first (by node B) and the copy from file1 to file2 is performed second (by node A). This inversion of the order of the Steps performed by nodes A and B causes the erroneous results labeled "Results after Step 2" in FIG. 5f.

What is needed is a method for maintaining a correct time in a data processing system where the method ensures that the local clocks of the nodes in the system agree on a correct time. Agreement among the nodes on some random time is not acceptable since the agreed upon time may differ from UTC. A system where all the nodes agree on a non-UTC time will avoid the problems of FIGS. 5a-5f, but will cause errors in time-stamping functions, and will not execute scheduled events at the expected times. In addition to maintaining a correct time, such a system should be able to survive the loss or erroneous operation of one or more nodes of the system and to identify and correct these faulty nodes if possible. The times kept by the local clocks of such a system should always be monotonic and increasing to avoid the problems of FIGS. 4a-4b.

SUMMARY OF THE INVENTION

The present invention overcomes the problems and disadvantages of the prior art by providing correct time from server nodes to clerk nodes at the request of the clerk nodes.

In accordance with the purpose of the invention, as embodied and broadly described herein, the invention comprises a method for maintaining correct time in a clerk node in a distributed processing system also containing a plurality of server nodes. The clerk and server nodes are connected together and the server nodes provide time information to the system. Each of the nodes includes a local clock keeping a local time and each of the local clocks has local drift value associated therewith representing a bound on the rate at which that local time deviates from a correct time value. The method comprises the steps performed by the clerk node of: requesting an updated time interval from at least one of the server nodes when the local inaccuracy of the local clock of the clerk node exceeds a predetermined maximum inaccuracy value; noting a request time according to the local clock of the clerk node when the clerk node requests the updated time interval; receiving from the server nodes respective updated time interval representations and corresponding delay values; noting, for each receipt of the updated time interval representations and corresponding delay values, a different response time according to the local clock of the clerk node; calculating a correct time interval from the received updated time interval representations, the received delay values, the noted request time, the noted response times, and the resolution value of the local clock of the clerk node, wherein the correct time is contained within said calculated correct time interval; and adjusting the local time kept by the local clock of the clerk node according to the calculated correct time interval.

The invention further comprises a method for maintaining a correct time in a clerk node including the steps performed by the server node of: receiving a request for an updated time interval from another node when the local inaccuracy of the local clock of the other node exceeds a predetermined maximum inaccuracy value; noting a receipt time according to the local clock of the server node when the server node receives the request from the other node; calculating a delay value from the noted receipt time; calculating an updated time interval representation from the local time of the local clock of the server node and the inaccuracy of the local clock of the server node: and sending the updated time interval representation and the corresponding delay value to the other node.

The accompanying drawings, which are incorporated in and constitute a part of the specification, illustrate one embodiment of the invention and, together with the description, serve to explain the principles of the invention.

DESCRIPTION OF THE PREFERRED EMBODIMENT

Reference will now be made in detail to preferred embodiments of this invention, examples of which are illustrated in the accompanying drawings. Whenever possible, the same reference numbers will be used throughout the drawings to refer to the same or like parts.

(a) HARDWARE OVERVIEW

Figure 1:
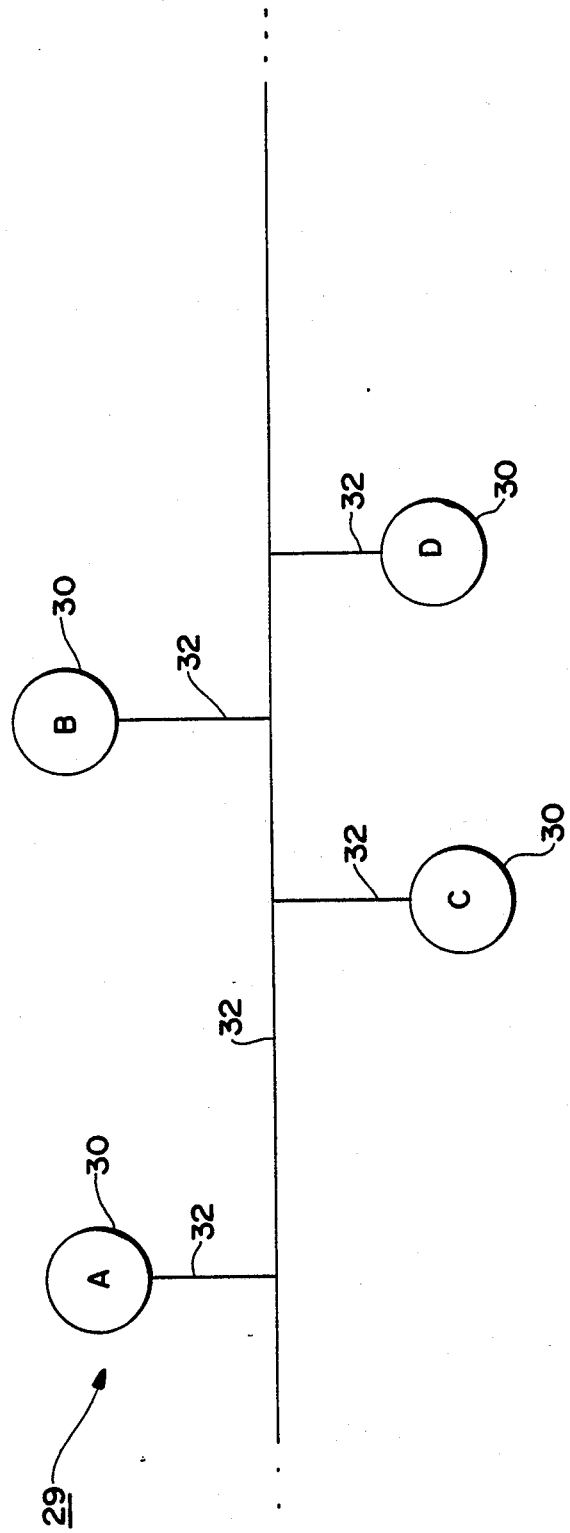
FIG. 1 is a general block diagram of a local area network.
Figure 2:
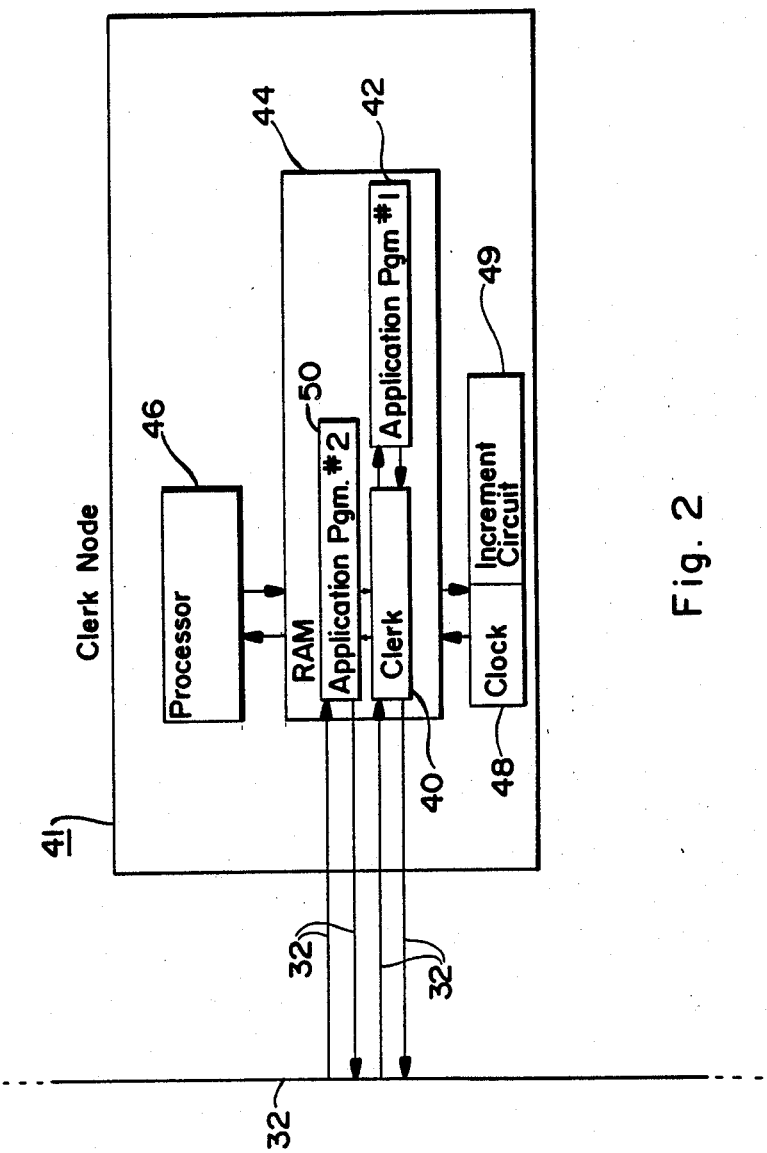
FIG. 2 is a block diagram of a clerk node which can be connected to a network.
Figure 3:
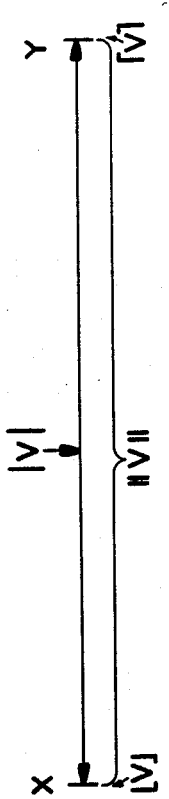
FIG. 3 is a diagram used to explain terms which define a time interval.
Figure 4A:
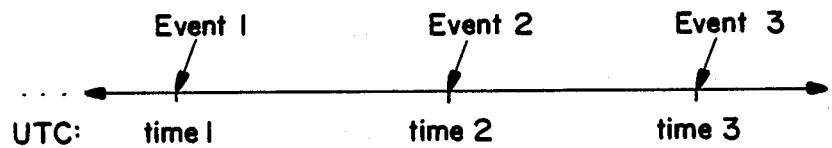
FIGS. 4a and 4b are diagrams used to illustrate a problem which may be caused by certain methods of resetting clocks in nodes of a network.
Figure 4B:
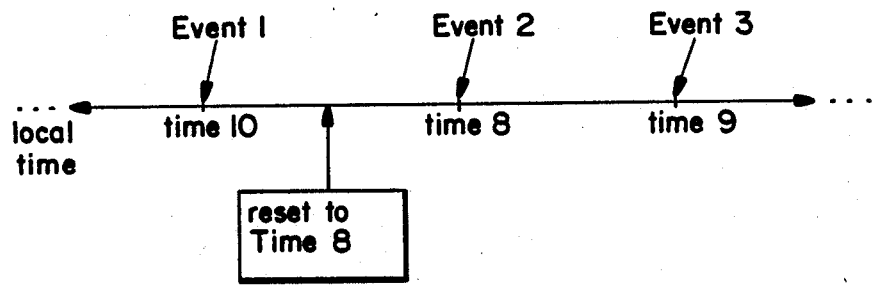
Figure 5A:
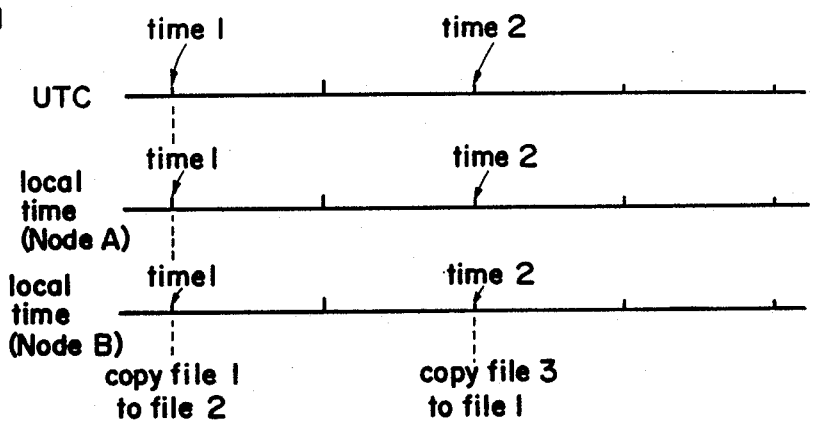
FIGS. 5a–5f are diagrams used to illustrate a problem which may be caused by timing malfunctions in nodes of a network.
Figure 5B:
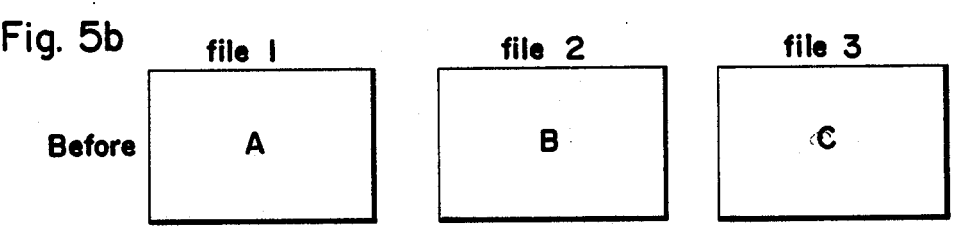
Figure 5B:
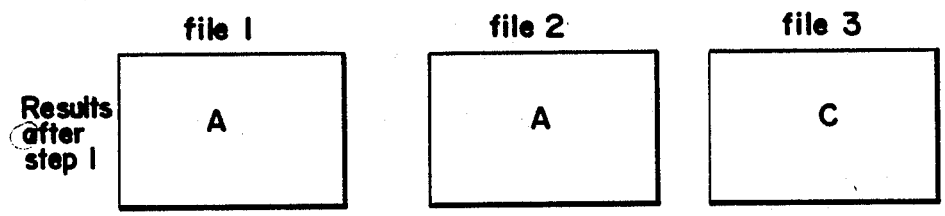
Figure 5B:
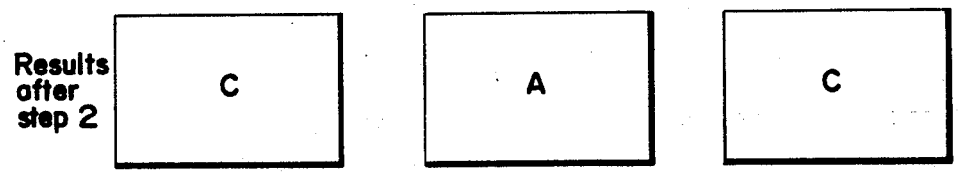
Figure 5C:
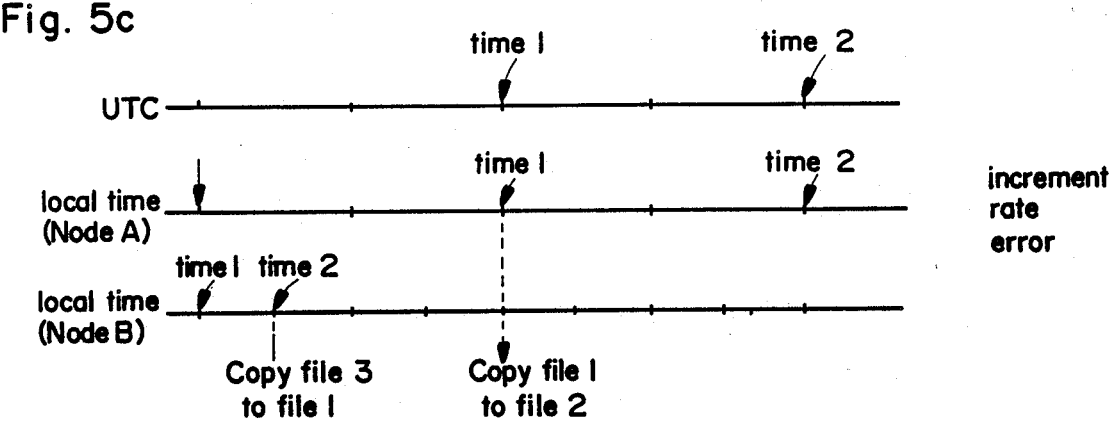
Figure 5D:
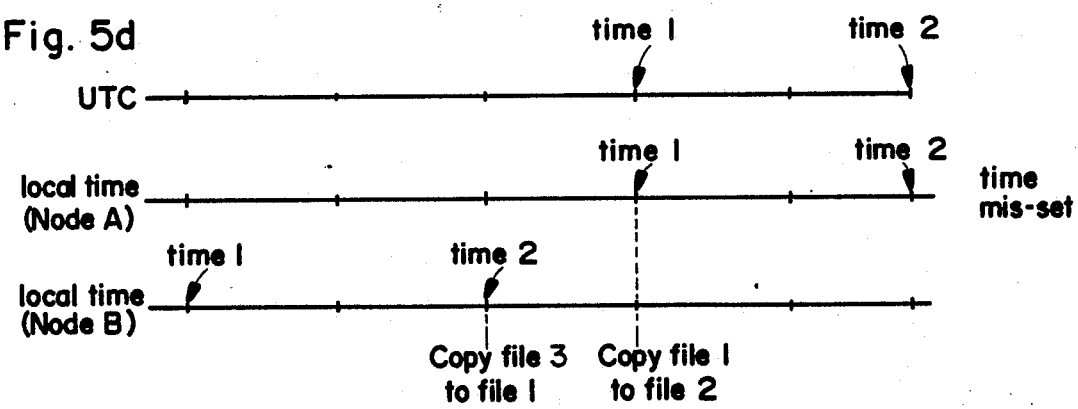
Figure 5E:
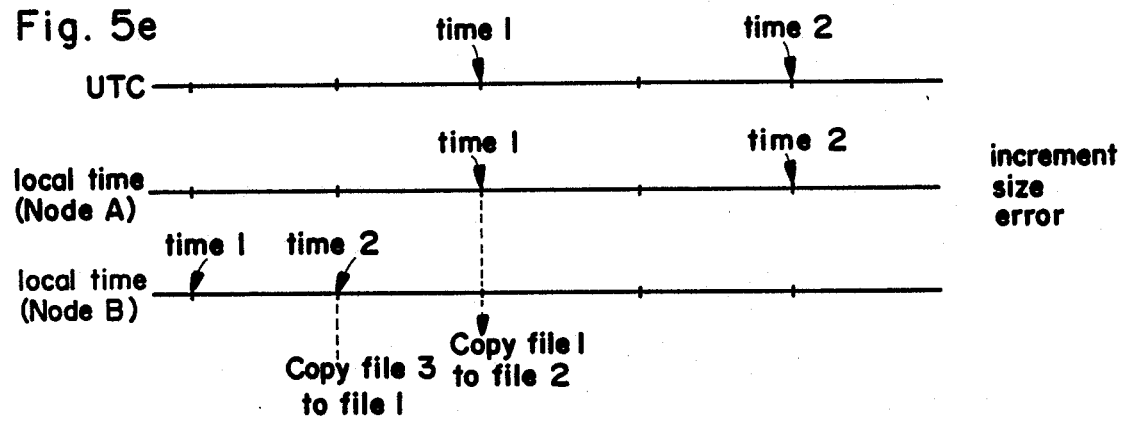
Figure 5F:
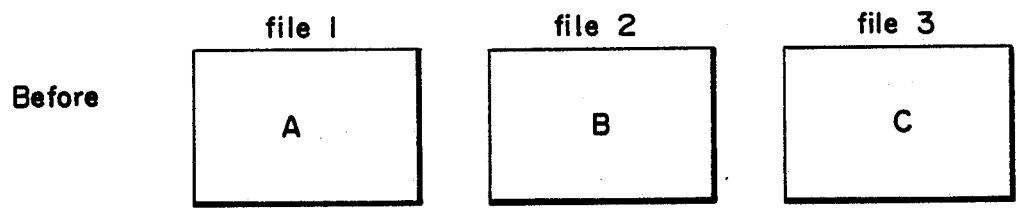
Figure 5F:
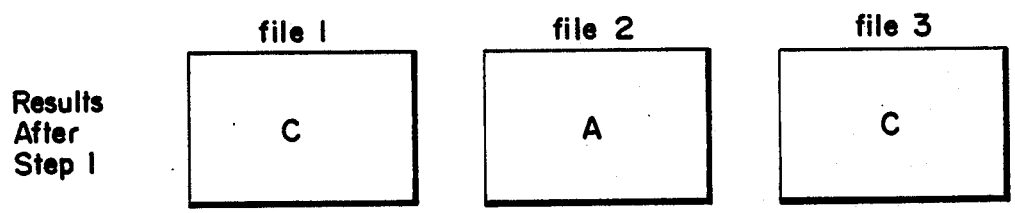
Figure 5F:
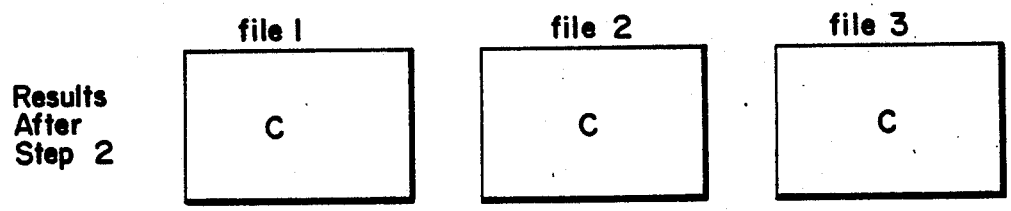

The method of the present invention is preferably carried out by data processing hardware executing a plurality of software programs. That hardware is preferably contained in nodes of a network such as network 29 shown in FIG. 1. As shown in FIG. 2, a node 41 which executes clerk program 40 is called a clerk node. The purpose of clerk node 41 is to service requests for a local time of local clock 48. As explained above, information passes from the connecting lines 32 into the clerk node 41 and to clerk program 40 executing on clerk node 41. Clerk program 40 updates its local clock 48 based on information received over lines 32 and, in response to requests from application program 42, reads the local time from local clock 48 and supplies it to application program 42.

Preferably, other nodes of the network execute similar software programs to clerk program 40, and supply time information to other application programs.

In accordance with the present invention, other nodes, called server nodes, execute software programs called server programs. Server programs send time information to clerk and server nodes over lines 32. Preferably, there are two types of server nodes: time maintainer nodes (also called time maintainers) and time provider nodes (also called time providers).

Figure 6:
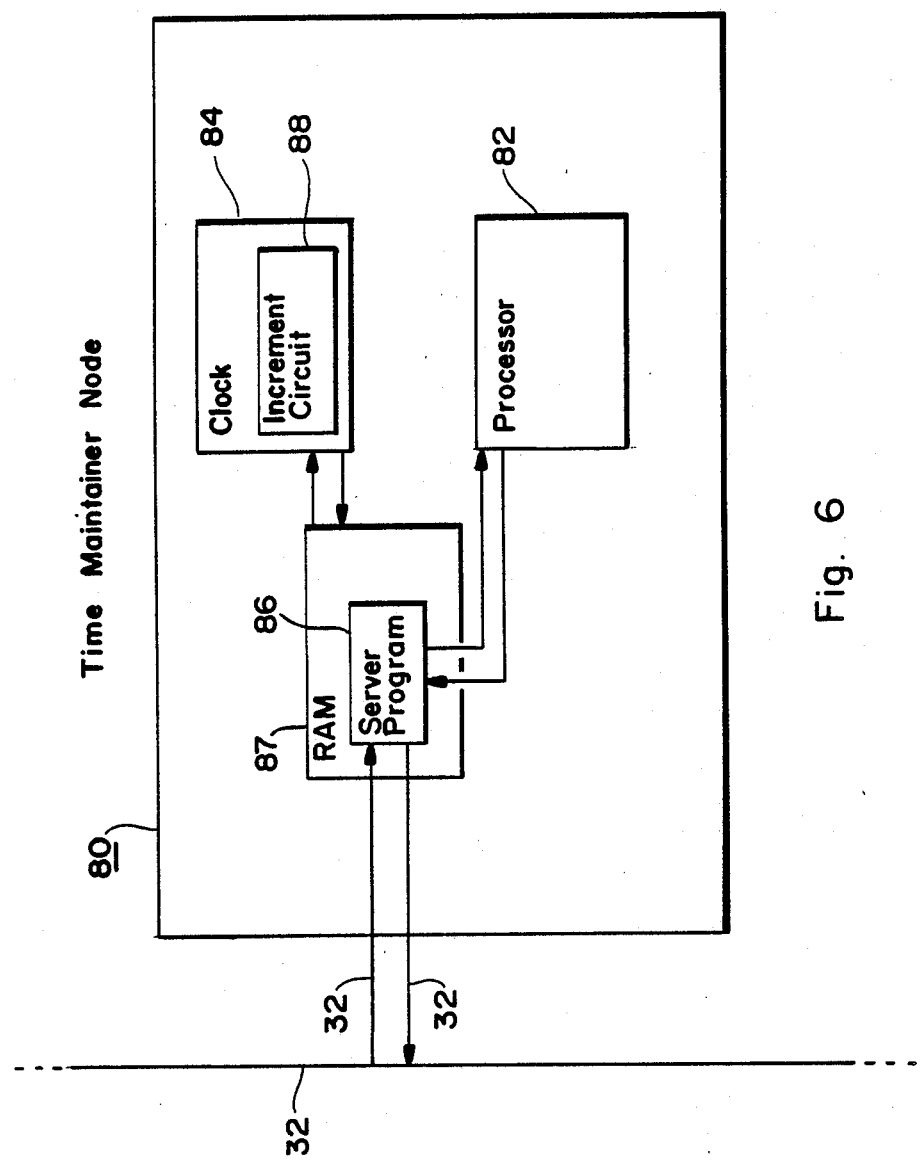
FIG. 6 is a block diagram of a time maintainer node of a network in accordance with this invention.

FIG. 6 shows an embodiment of a time maintainer node 80. Time maintainer node 80 is connected to the network via lines 32. Similar to clerk node 40, time maintainer node 80 contains a processor 82 and a local clock 84. Local clock 80 contains an incrementation circuit 88 for periodically increasing the local time of local clock 84 by a predetermined resolution value.

Upon receiving a request for an updated time from a clerk node over the network, processor 82 executes a server program 86, which is stored in a memory 87 (preferably RAM) of time maintainer node 80. Server program 86 sends time information from server node 80's local clock 84 a to requesting clerk node over the network.

Some time maintainer nodes may also include a battery back-up clock and non-volatile memory. The non-volatile memory stores a base local time and inaccuracy at a time Tr, which can be recovered in case of system failure. Similarly, the battery back-up clock continues keeping a local time during system failure.

Figure 7:
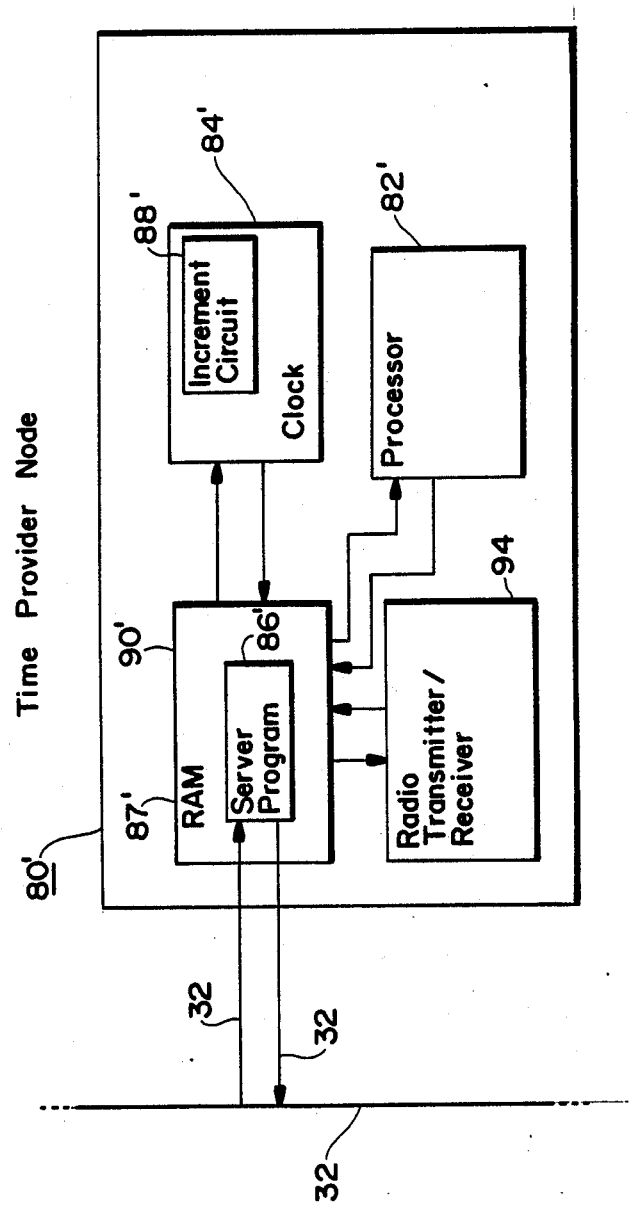
FIG. 7 is a block diagram of a time provider node of a network in accordance with this invention.

FIG. 7 shows a second type of server node 80' called a time provider node. Like time maintainer node 80 of FIG. 6, time provider node 80' contains a processor 82' and a local clock 84'. A server program 86', which is stored in a memory 87' of the time provider node 80' and executed by processor 82' of the node 80', sends time information from the local clock 84' over the network upon receiving a request from a clerk node.

Preferably a requesting clerk node does not perceive any difference between time maintainer node 80 and time provider node 80'. Clerk programs use identical protocols to communicate with both types of nodes and the information received by a clerk program from both types of server nodes preferably has the same format.

The key difference between a time maintainer node, such as node 80, and a time provider node, such as node 80', lies in the way those nodes update their local clocks. Time maintainer node 80 updates its local clock using the same method as clerk nodes, which is described in detail below. Time provider 80' updates its local clock 84' by accessing an external time source.

As shown in FIG. 7, time provider node 80' contains a radio transmitter/receiver 94 which is used to receive time signals from a UTC broadcasting source, such as the WWV in Denver, Colo. These received time signals are used by server program 86' to update local clock 84' of time provider node 80'. It should be noted that time provider nodes could alternatively access some other independent time source outside the network that provided time information not contaminated by any system delays, drifts of the local clock, or other inaccuracies. Preferably, a time provider node that cannot access its external source will alternately update its local clock using the same method as time maintainer and clerk nodes.

(b) OPERATION OF CLERK NODES

A method according to this invention will be described with respect to clerk node 40 shown in FIG. 2, although it should be understood that a network using the present invention may include other clerk nodes operating according to the method described below. The description of the operation of clerk nodes in accordance with the present invention will be presented in two parts. The first part describes how a clerk maintains its local clock and knowledge of the inaccuracy of its clock. This first part includes the method by which a local clock of a clerk node is correctly and monotonically adjusted to compensate for drift. The second part describes how a clerk node resynchronizes (obtains a new estimate of the time from the server nodes). This second part describes under what circumstances a clerk resynchronizes, the protocol for obtaining time estimates from server nodes, and an algorithm for computing an optimal correct time interval from these estimates.

(i) Monotonically Adjusting the Local Clock in Clerk Nodes

A local clock, such as local clock 48 of FIG. 2, preferably comprises a software register representing the current time. This register preferably is updated by incrementation circuit 49, which may comprise a service routine invoked by a hardware interrupt of a periodic timer. In such an embodiment, these interrupts are called "ticks." The time between ticks determines the resolution p of the local clock, which, in a preferred embodiment, equals 10 ms. An interrupt service routine services tick interrupts and increments the local clock by p. By changing the amount of the increment while keeping the time between ticks constant, the clock drift can be artificially altered, causing local clock 48 to gain or lose time. Alternatively, one could alter the time between ticks while keeping the software increment at a predetermined value.

Figure 8:
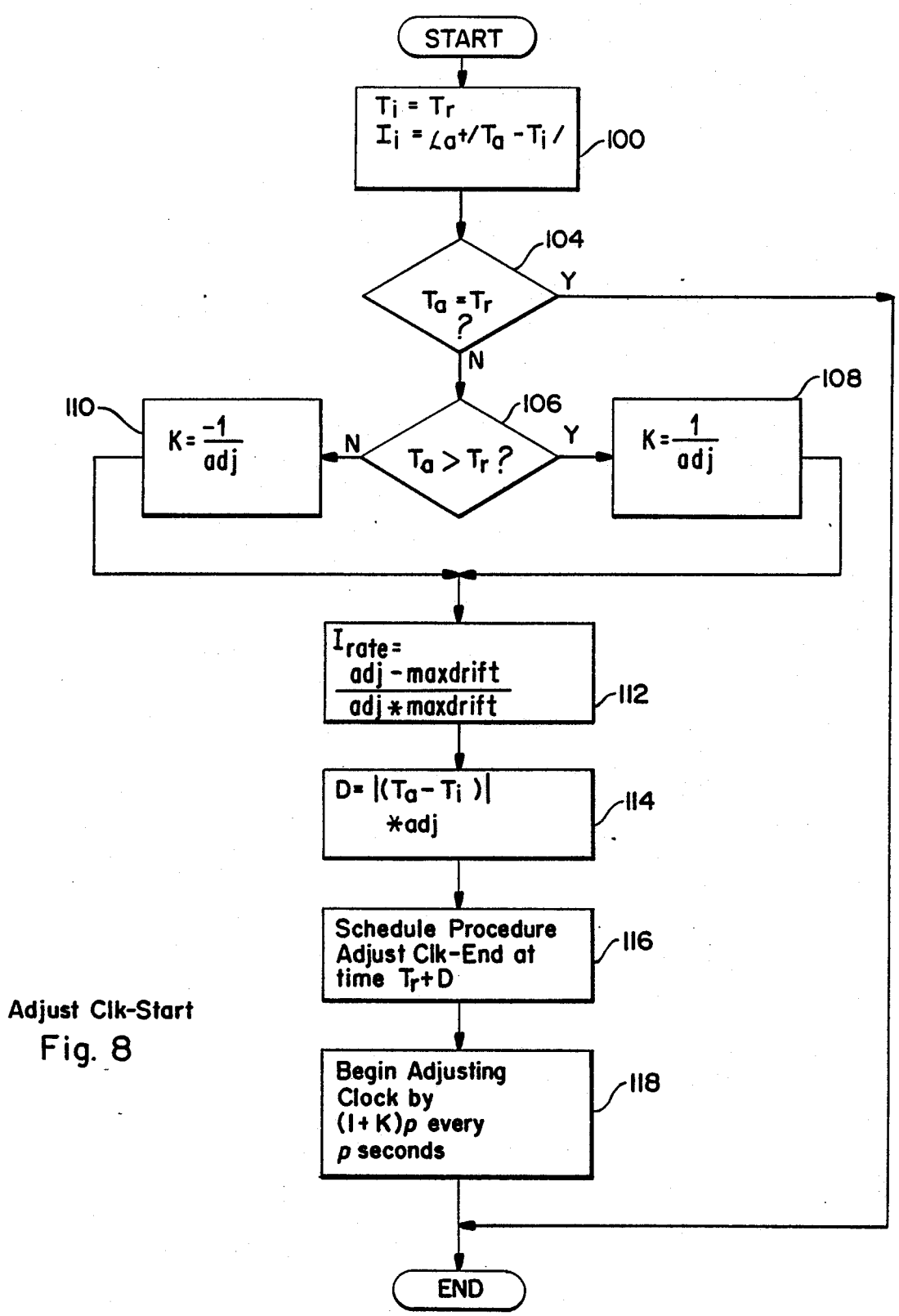
FIG. 8 is a flow chart of one method in accordance with this invention of adjusting a local clock in a clerk node of a network.
Figure 9:
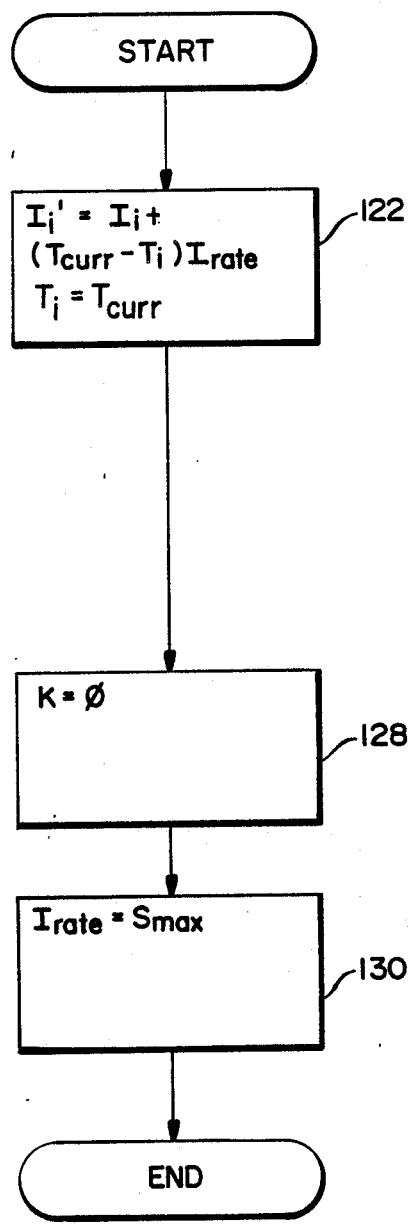
FIG. 9 is a flow chart of further steps of the method of FIG. 8 in accordance with this invention of adjusting a local clock in a clerk node of a network.

The preferred manner by which clerk node 40 adjusts its local clock 48 to a new time can be described by the procedures of FIGS. 8 and 9. FIG. 8 shows a flow chart for a procedure called "AdjustClk$_{13}$Start," which is executed at a "resynchronization time," $T_r$, to begin incrementing the local clock by a new incrementation value instead of by the predetermined value p. FIG. 9 shows a flow chart for a procedure called "AdjustClk$_{13}$End," which is executed D is the duration for which the new incrementation value is used) to end incrementing the local clock by the new incrementation value and resume incrementing by p.

In FIGS. 8 and 9, clerk program 40 has determined that the actual time will be $<T_a, I_a>$ when local clock 48 reads Tr. The notation $<T_a, I_a>$ represents a time interval $[T_a - I_a, T_a + I_a]$ having time $T_a$ as a midpoint and extending an inaccuracy distance $I_a$ in both a positive and negative direction. "Maxdrift" represents the predetermined minimum number of seconds during which the local clock will normally drift one second. Thus, maxdrift=1δmax. The value "k" represents a predetermined drift increment rate, i.e., the rate at which the drift of the local clock will be artificially increased or decreased during the interval [Tr,Tr+D]. In the preferred embodiment, $k \geq -1$. In other words, a local clock cannot be decreased at a rate of more than one second per second or it will run backwards. In FIGS. 8 and 9, "adj" represents a predetermined number of seconds during which the drift of the clock is altered by one second. (Thus, adj=1/|k| and, in the preferred embodiment, adj≧1.) "I$_{rate}$" increases in response to the drift of the local clock. Under normal operation, I$_{rate}$=δmax, i.e., I$_{rate}$ equals the maximum drift of the local clock. However, while the local clock is being adjusted I$_{rate}$ is decreased to compensate for the drift increment rate, k.

First, as shown in FIG. 8, at the resynchronization time $T_r$, a current time, $T_i$, is set to $T_r$ (Step 100). An inaccuracy, $I_i$, corresponding to $T_i$, is set to:

$I_i = I_a + |T_a - T_i|$ (Step 100), where $I_a$ is the inaccuracy of the new time value and $|T_a - T_i|$ is an additional inaccuracy representing the difference between the local clock and the actual time.

If $T_r$ is equal to $T_a$ (Step 104), then the local clock is already set correctly and no further adjustment is needed. If $T_r$ is not equal to $T_a$, however, and if $T_a$ is greater than $T_r$ (Step 106), then k, the rate at which to alter the drift of the local clock is positive (Step 108) so that the local Clock will gain time. Otherwise, k is negative (Step 110) so that the local clock will lose time.

Next, I$_{rate}$, the rate at which the inaccuracy of the local clock increases in response to the drift of the local clock, must be set to reflect the changed drift value of the local clock. I$_{rate}$ is calculated according to the following formula:

$$I_{rate} = \frac{adj - maxdrift}{adj * maxdrift}$$

(Step 112). Because, in the preferred embodiment, the absolute value of the adjustment rate, |k|, is greater than the drift rate, δmax, adj<maxdrift, i.e., $1/k < -1/$δmax, and therefore I$_{rate}$ is negative and I$_i$, the inaccuracy before adjustment, is less than I$_i$, the inaccuracy after adjustment. "D," the duration of the adjustment is computed in Step 114 using the formula:

$$D = |(T_a - T_i)| * adj.$$

Because adj equals the predetermined number of seconds during which the drift of the local clock is altered by one second and because $|T_a - T_i|$ equals the total number of seconds by which the clock is to be altered, the product of adj and $|T_a - T|$ yields D. The procedure AdjustClk$_{-End}$ is then scheduled to execute at time Tr+D (Step 116) and clock increment circuit 49 begins incrementing local clock 48 by (1+k)p (Step 118).

It is necessary that the procedure AdjustClk_Start completes execution before the next tick after $T_r$. Otherwise, the procedure would have to compensate for its own execution time.

For the purpose of example, suppose that the variables p, k, δmax, adj, maxdrift, $T_a$, $I_a$, and $T_r$ have the following values:

p = ½ sec
k = 4/5 sec per second
δmax = ¼ sec per second
adj = 1/k = 5/4 sec
maxdrift = 1/max = 4 sec
$T_a$ = 5
$I_a$ = 3
$T_r$ = 1
Then, $$\begin{aligned}
I_i &= I_a + |T_a - T_r| \\
&= 3 + |5 - 1| = 7 \text{ sec} \\
I_{rate} &= \frac{adj - maxdrift}{adj * maxdrift} \\
&= \frac{5/4 - 4}{5/4 * 4} = -11/20 \text{ sec per second} \\
D &= |(T_a - T_i)| * adj \\
&= |(5 - 1)| * 5/4 = 5 \text{ sec.}
\end{aligned}$$

In other words, for local clock 48 to gain 4 seconds, its drift must be increased by 4/5 seconds for a total duration of 5 seconds. Thus after 5 seconds (n=10 increments), $$T_i = T_r + n(1=k)p$$
$$= 1 + 10$$
$$(1+4/5)1/2 = 10.$$

Local clock 48 has gained 5 seconds due to normal incrementation and 4 seconds due to its altered drift rate.

The Steps of FIG. 9 return local clock 48 to its regular incrementation procedure. At time $T_r-D$, a new inaccuracy, $I_i'$ is computed according to the formula:

$$I_i' = I_i + (T_i' - T_i) * I_{rate}$$

(Step 122), where $I_i$ is the inaccuracy from Step 100 of FIG. 8, $T_i$ is the current value of local clock 48, $T_i$ is the time from Step 100 of FIG. 8, and $I_{rate}$ is the increase in the inaccuracy from Step 112 of FIG. 8. In the current embodiment, because $I_{rate}$ is negative, $I_i' < I_i$. Both $T_i'$ and $I_i'$ are stored in memory 44 to be used by clerk 40 in determining a time to resynchronize as described below.

Therefore, in the above example, the new inaccuracy of local clock 48 is:

$$I_i' = I_i + (T_i' - T_i) * I_{rate}$$
$$= 7 + (10 - 1) * -.55 = 7 - 4.95 = 2.05.$$

In Step 128, the amount to alter the clock's drift, k, is set to zero because the clock adjusting procedure is done. Similarly, the rate of increase of the inaccuracy is reset to its original value of δmax in Step 130.

The procedures illustrated in FIGS. 8 and 9 thus guarantee that local clock 48 remains monotonic. However, this may not always be desired behavior. In particular, if local clock 48 differs from the correct time by a large value, it may be preferable to simply reset it to the correct time rather than to adjust its drift using the procedures of FIGS. 8 and 9.

(ii) Determining When Clerk Nodes
Should Obtain Time Estimates

Clerk program 40 resynchronizes its local clock 48 when its inaccuracy exceeds a predetermined value $I_{max}$. If a clerk program has resynchronized to a correct time $T_a$ with inaccuracy $I_a$, the inaccuracy at any later time T is given by $I = I_a (T - T_a)I_{rate}$, where $I_{rate} = \delta max$. However, the preferred embodiment does not guarantee any bound on $I_{max}$. As a result, it is possible that $I_{max} - I_a$ is small or even negative. To prevent clerk program 40 from synchronizing continuously, the preferred embodiment computes the next time to resynchronize, T, according to the following rule (where "max" is a function that selects a maximum of two values and "Synchold" is a predetermined value representing the shortest time allowed between resynchronizations in the preferred embodiment).

$$T = T_a + \max(\text{synchold}, (I_{max} - I_a)/\delta max).$$

$(I_{max} - I_a)/\delta max$ represents a time local clock 48 will equal or exceed $I_{max}$.

(iii) Obtaining Time Estimates from
Server Nodes by Clerk Nodes

In the preferred embodiment of this invention, clerk program 40 obtains the time from a particular server node by making an explicit request to the server program of that node for the time and then waiting for a response. This method of access has two features. First, it makes it possible for a clerk to measure the delay incurred due to the communication protocol overhead and, hence, makes it possible to bound the inaccuracy of the received time. Second, it requires no specific underlying communications hardware.

Figure 10:
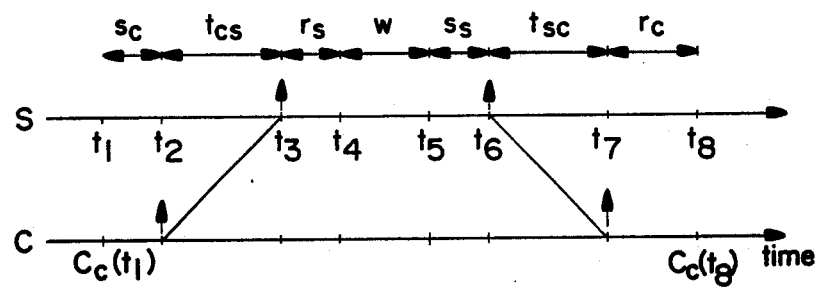
FIG. 10 is a diagram illustrating the time delays in a request from a clerk and a response from a server.

FIG. 10 is a time-space diagram of a request from a clerk, such as clerk program 40, and a response from a server program, such as server program 86 of time maintainer node 80 or server program 86' of time provider node 80'. The times $t_i$, i = 1,2 ... 8, correspond to the values of UTC (which can never be known exactly due to the delays discussed above.) The value of the clerk's clock at time ti is denoted by $C_c(t_i)$ and the value of the server's clock at time $t_i$ is denoted by $C_s(t_i)$. A double arrow denotes a message transmission and a single arrow denotes a message reception.

Figure 11:
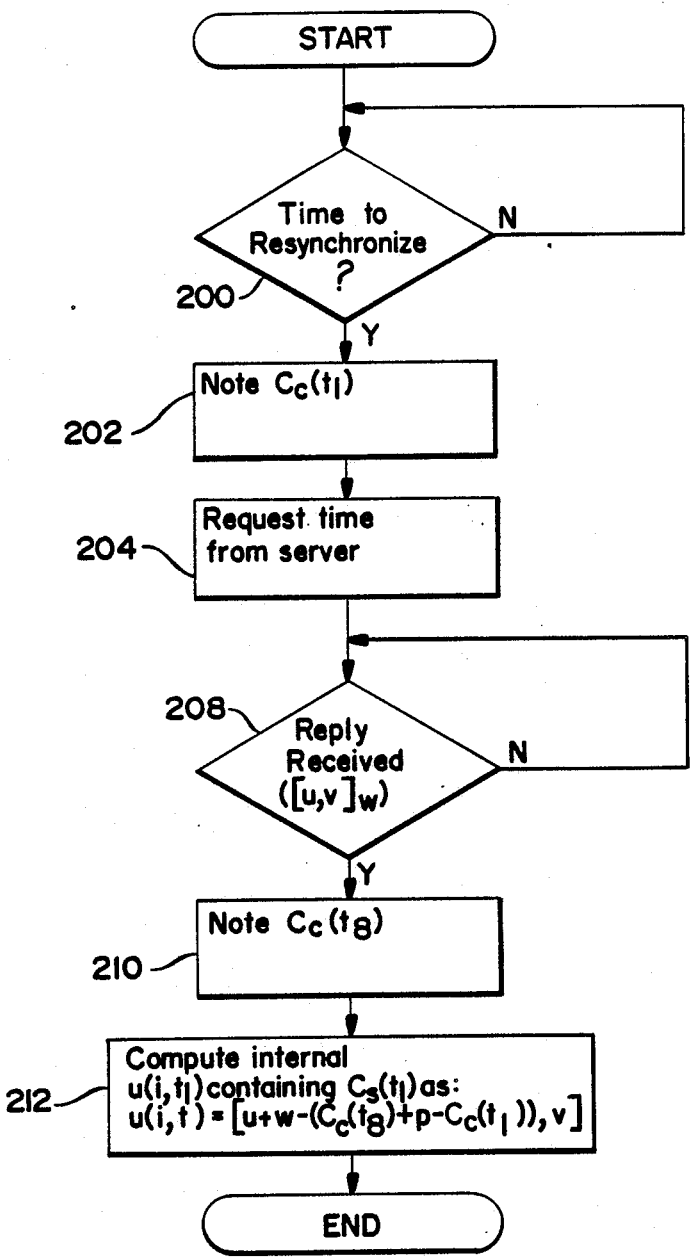
FIG. 11 is a flow chart of the preferred procedure by a clerk for requesting a time update from a server.

FIG. 11 is a flow chart of a preferred method performed by the clerk node for making the request illustrated by FIG. 10. Once the clerk decides that it is time to resynchronize (Step 200), at $t_1$, the clerk reads its local clock which returns the value $C_c(t_1)$ (Step 202). The clerk then initiates a request to the server (Step 204) the request is transmitted at time $t_2$ after an unknown sending delay $S_c$, as shown in FIG. 10, and the request is received by the server at time $t_4$ after unknown delays of $\tau_{cs}$ and $r_s$.

The clerk waits until it receives a response from the server (Step 208) in the form of an interval [u,v], and a delay w. (In a preferred embodiment, the interval [u,v] is represented by a midpoint value and an inaccuracy value. Other embodiments could represent [u,v] by two endpoints.) The response from the server is received at time $C_c(t_8)$ (Step 210) after incurring random delays similar to those of the request, namely $S_s$, $\tau_{sc}$, and $r_c$.

Ideally, the clerk would compute the time $C_s(t_1)$ from the value $C_s(t_4)$ returned with the response as follow:

$$C_s(t_1) = C_s(t_4) - x,$$

where $s_c + \tau_{cs} + r_s$. However, x is the part of the delay that cannot be known exactly. It is in the range $0 \leq x \leq t_8 - t_1 - w$. If x=0, then $C_s(t_1) = C_s(t_4)$ while if $x = t_8 - t_1 w$, then $C_s(t_1) = C_s(t_4) + w - (C_c(t_8) - C_c(t_1))$. Hence, at best, the time seen by the clerk at $t_1$ can be bounded by $$C_s(t_4) + w - (C_c(t_8) - C_c(t_1)) \leq C_s(t_1) \leq C_s(t_4),$$

but it can never be known exactly. The effect of the drift of the clerk with respect to the server over the time period of the exchange is neglected. Clearly, by minimizing the components of delay, or by compensating for known delays such as w, the interval bounding $C_s(t_1)$ can be reduced.

Since local clock 48 is discrete, the timestamp $C_c(t_8)$ actually corresponds to the value of local clock 48 in the range $[C_c(t_8), C_c(t_8)+]$, where p is the resolution of local clock 48. Furthermore, the time provided by server i is in fact an interval $W(i,t_4)=[u,v]$ rather than a scalar value. Thus, the time interval of $S_i$ at time $t_1$ as seen by the clerk is given by:

$$U(i,t_1)=[u+w-(C_c(t_8)+p-C_c(t_1)),v]$$

In the preferred embodiment of the invention, the clerk compiles $U(i,t_i)$ in this manner (Step 212).

The value w, which is returned with the time to the clerk, corresponds to the known delay at the server after the time which is reported to the clerk (and hence, it may include any deterministic component of $S_s$). The server does not include any deterministic component of $r_s$ in the value of w returned as this delay occurs before $t_4$. Furthermore, there is no need to return the value of known delays before $t_4$ since the server can include this information by decrementing the time returned (i.e., $C_s(t_4)$) and by incrementing w by the same amount. It would not be incorrect to report a value of w less than the actual delay incurred. This smaller value of w would merely cause a larger than necessary inaccuracy in local clock 48. It would, however, be incorrect to report a value of w greater than the actual delay. This larger value of w would cause the inaccuracy of local clock 48 to be smaller than could be justified by the actual delay incurred by the server. To maximize performance, w should reflect the delay at the server as accurately as possible, but w should never be greater than the actual delay incurred.

Since request and response packets may be lost or servers may become unavailable, a clerk waits only a predetermined time for a response to a request.

(iv) Computing the Correct Time from Received Time Estimates in Clerk Nodes

Figure 12:
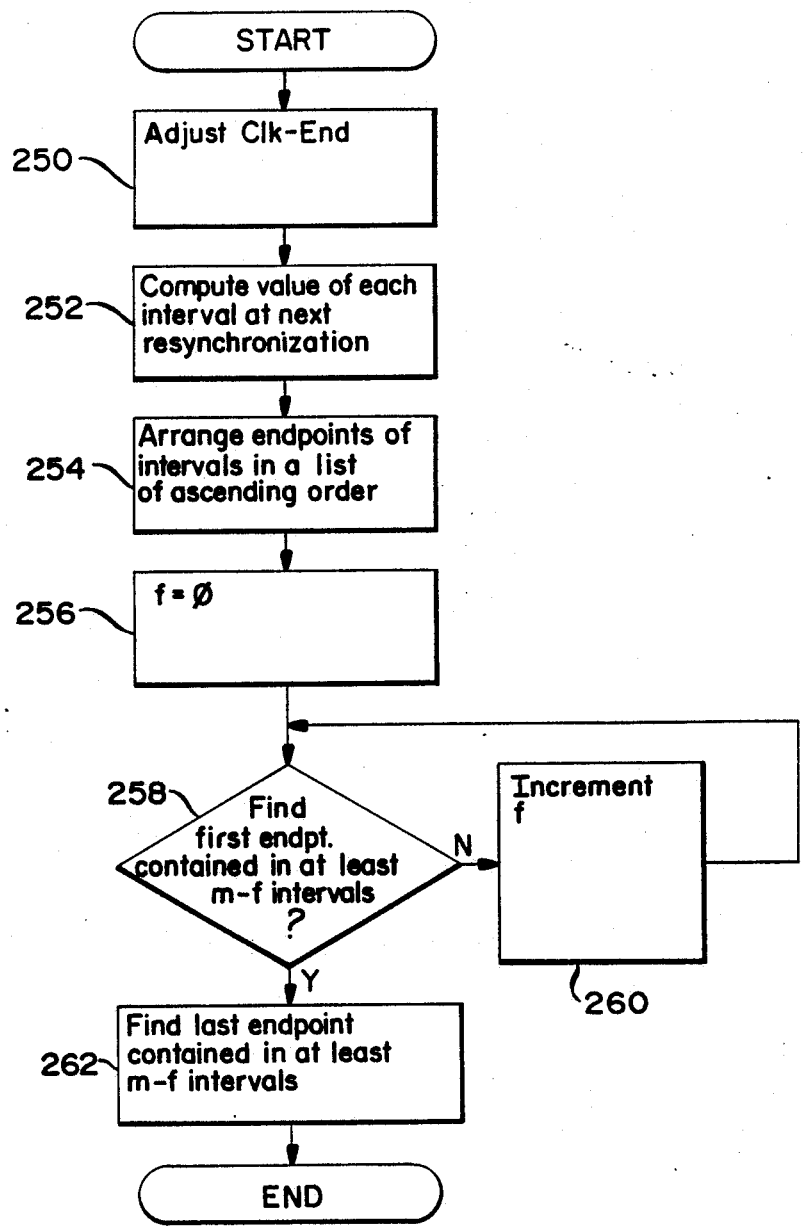
FIG. 12 is a flow chart of part of a preferred method of the present invention to compute the smallest interval guaranteed to contain UTC.

FIG. 12 is a flow chart of the preferred method used by clerk program 40 in accordance with of the present invention to compute the smallest interval guaranteed to contain UTC. Assume that clerk $C_i$ obtains the time from M servers by using the method in FIG. 11 and, therefore, has a set of intervals $U(i,T_j)$ $j=1,2 \ldots M$. $T_j$ is the value of the clerk's clock at some arbitrary instant $t_3$ (i.e., $T_j=C(i,t_j)$) and $U(j,T_j)$ is the value of the $j^{th}$ server's clock at $t_j$, as seen by the clerk.

First, procedure AdjustClk_ End of FIG. 9 is invoked (Step 250). This ensures that the clock is drifting at a rate less than maxdrift (i.e., k=0). Next, for each interval received from a server, its value at the next resynchronization time $T_r$ is computed from $$U(j,T_r)=U(j,T_j)+(T_r-T_j)\pm(T_r-T_j)\delta max$$

(Step 252).

Next, all the endpoints of the intervals $U(j,T_r)$ are arranged into a list in ascending order (Step 254). The list is of length 2M because there are two endpoints for each interval in the list. If two or more endpoints have the same value, those intervals corresponding to lower bounds must preceed those intervals corresponding to upper bounds in the list. That is, if $\lfloor U(i,T_r) \rfloor = \lceil U(j,T_r) \rceil$ then $\lfloor U(i,T_r) \rfloor$ must preceed $\lceil U(j,T_r) \rceil$ in the list.

Next, a counter, f, representing the number of existing faulty servers is set to zero (Step 256) and the list is scanned in ascending order to find the first endpoint that is contained in at least M−f intervals (Step 258). This point, if found, is a lower endpoint of the smallest time interval containing UTC. If no such point is found then there are more than f faulty servers. The counter f is incremented (Step 260), control returns to Step 258, and a smaller number of intervals is scanned for a common endpoint. If the lower endpoint is found (Step 258), then the list is scanned in descending order to find a second endpoint that is contained in at least M−f intervals (Step 262). This point is an upper endpoint of the smallest time interval containing UTC.

Figure 13:
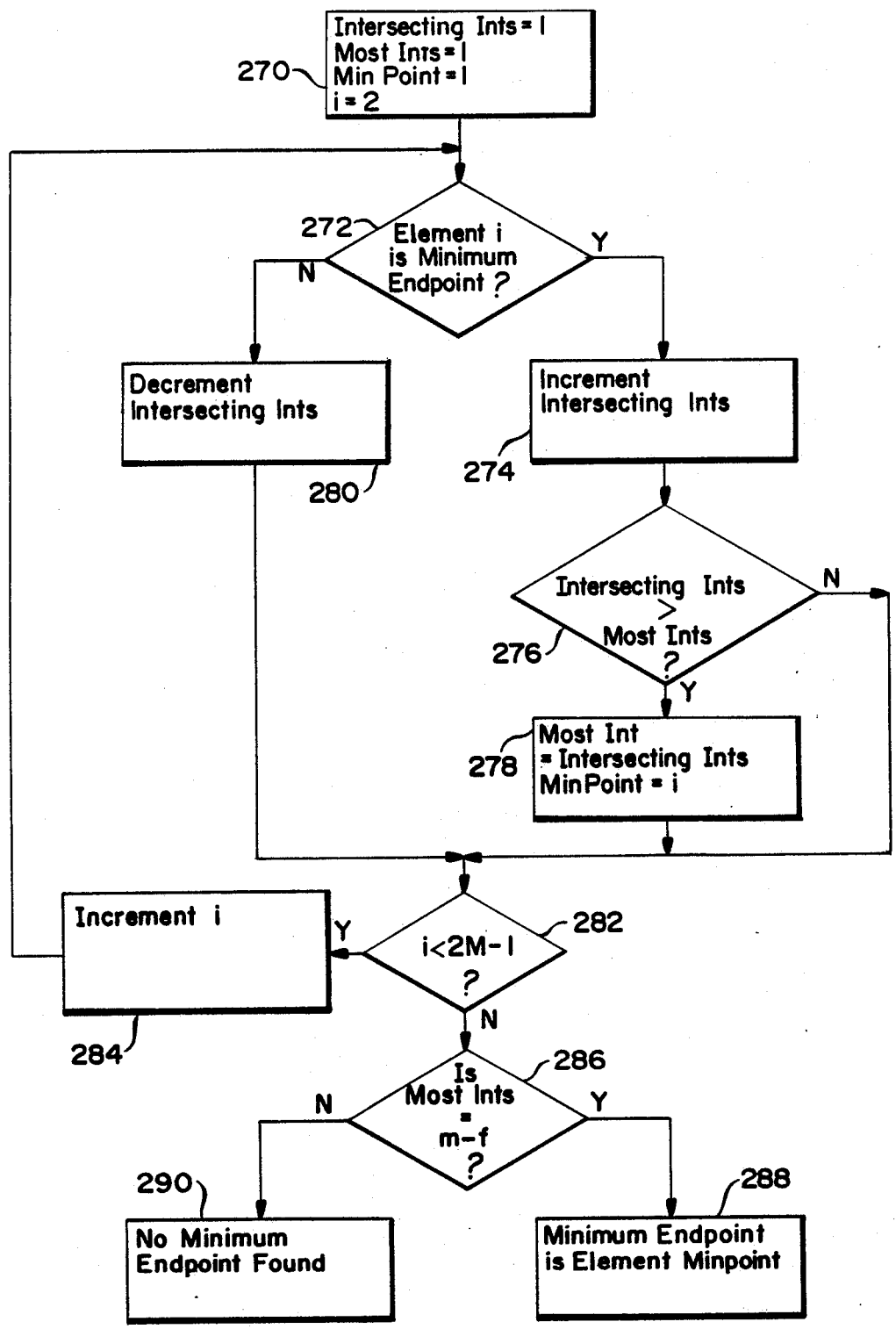
FIG. 13 is a flow chart of a preferred method of efficiently finding the minimum endpoint of the best interval.

Scanning the list for the first upper and lower endpoints is accomplished more easily if the elements of the list are marked as maximum end points, for minimum end points depending on whether they correspond to $\lceil U(j,T_r) \rceil$ or $\lfloor U(j,T_r) \rfloor$ respectively FIG. 13 contains a flow chart describing a method for finding the lower endpoint of the best correct time interval efficiently. This method is used in Step 262 of FIG. 12. First, two counters, IntersectingInts and MostInts, are initialized to "1" IntersectingInts represents a number of intervals containing a tentative minimum endpoint. MostInts represents number of intervals containing a current minimum endpoint. A third loop counter, i, is initialized to "2" to indicate that the second list element is being considered as the tentative minimum endpoint. The first element in the ordered list of endpoints of Step 254 of FIG. 12 is designated as the current minimum endpoint by setting Minpoint to "1" (Step 270). Thus, the initial value of IntersectingInts indicates that only one interval thus far contains the tentative minimum endpoint indicated by the counter i. The initial value of MostInts indicates that the first endpoint in the list (designated by Minpoint) is contained in one interval. Next, for increasing values of i through 2M−1, the following Steps are performed.

If the ith list element is greater than the tentative minimum endpoint designated by Minpoint (Step 272), then the counter IntersectingInts is incremented (Step 274), and a test is performed to determine if the counter IntersectingInts is greater than the counter MostInts (Step 276). If yes, the counter MostInts is set to IntersectingInts, the number of intervals containing the ith list element is saved, and the current value of i is saved as the tentative minimum endpoint (Step 278). Otherwise, if IntersectingInts is not greater than MostInts, control passes to Step 282.

If the ith list element is not greater than the tentative minimum endpoint (Step 272), then the counter IntersectingInts is decremented (Step 280) and control passes to Step 282.

At Step 282, a test is performed to determine if more endpoints in the list have yet to be examined. If yes, i is incremented (Step 284) and Steps 272 through 282 are repeated to in the list of endpoints have been checked and control passes to Step 286. At Step 286, a test is performed to determine if an endpoint within M-f intervals has been found. If yes, a minimum endpoint has been found (Step 288). Otherwise, no endpoint is contained in at least M-f intervals (Step 290). A similar algorithm can be used to find the maximum endpoint of the best correct time, as required by Step 262 of FIG. 12, by searching the endpoint list in descending order.

The result of the method of FIGS. 12 and 13 is the time (with inaccuracy) that the clerk's clock should read when he clock value becomes $T_r$, i.e., $<T_a,I_a<$. A clerk preferably uses the times from all the servers that are available. Other embodiments, however, may use the times from fewer than all of the servers.

(v) Leap Seconds In Clerk Nodes

All clerks become faulty immediately when leap seconds occur unless their inaccuracies are sufficiently large so that their intervals contain UTC both before and after the leap second. To ensure correctness in the presence of leap seconds, clerks must increase their inaccuracies by one second whenever a leap second might occur. Unfortunately, leap seconds may occur at any point in time, the only requirement being that at least eight weeks warning be given by the International Time Bureau (BIH) of an impending leap second. However, when choosing the time of a leap second, BIH is required to give preference to the last second in the months of June and Dec. Secondary preference is given to the last days of Mar. and Sept. To simplify the matter, the preferred embodiment assumes that leap seconds occur at all four possible times.

Figure 14:
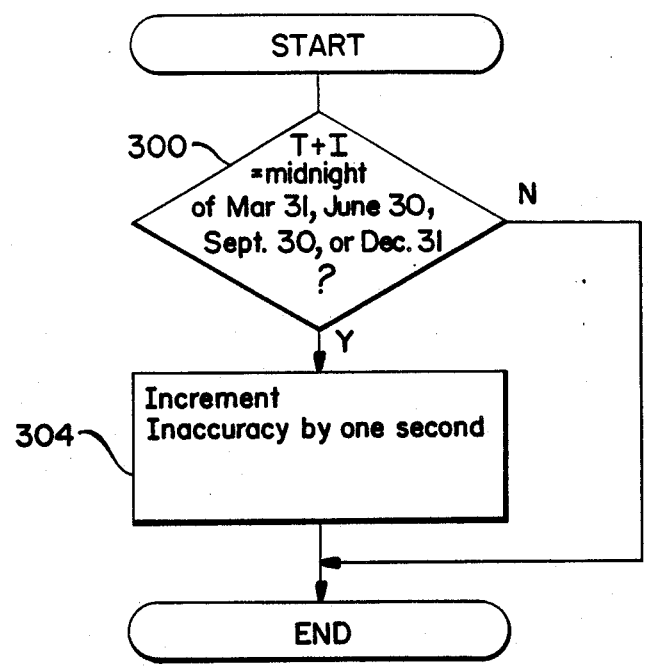
FIG. 14 is a flow chart of a preferred method of the present invention for adjusting for leap seconds.

FIG. 14 is a flow chart for making adjustments for leap seconds by clerk program 40. If a current time, T, of local clock 48 plus a current inaccuracy, I, of local clock 48 is midnight of either Mar. 31, or June 30, Sept. 30, or Dec. 31 (Step 300) then the current inaccuracy, I, is incremented by "1" (Step 304). This adjustment is always performed whether or not a leap second actually occurs. Other embodiments may compensate for leap seconds only in response to a command from a human operator.

(C) OPERATION OF SERVER NODES

A description of the operation of server nodes consists of four parts. These parts are: how servers initialize and operate; how time maintainer nodes periodically obtain a new time from other servers; how time maintainer nodes can be manually reset: and how servers periodically check for faulty servers.

(i) Response to Clerk Node's Requests by Server Node

Figure 15:
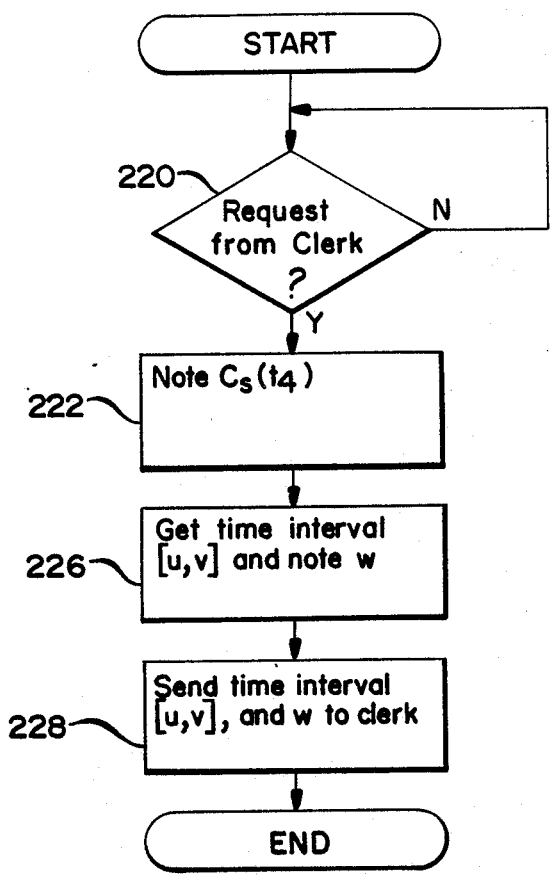
FIG. 15 is a flow chart of a preferred method of the present invention of how a server node responds to a request for time from a clerk node.

FIG. 15 is a flow chart performed by a server in responding to a clerk node's requests, as demonstrated in FIG. 10. As shown in FIG. 15, a server waits until it receives a request from a clerk (Step 220) and notes a time of receipt $C_s(t_4)$ (Step 222). This time of receipt is later than the actual arrival time of the request by $r_s$. The server processes the request by computing its own inaccuracy at time $C_s(t_4)$ and by noting a known component of delay w (Step 226). Lastly, the server transmits the local time interval and w to the requesting clerk at time $C_s(t_6)$ (Step 228). This action takes a time $S_s$. As explained above, delays $r_s$ and $S_s$ are random and unpredictable.

(ii) Initialization of Server Nodes

A time provider initializes by obtaining the time from an external source. It then attempts to discover other servers, by means of the protocols described below, for the purpose of periodically checking for faulty servers.

When a time maintainer initializes, it first attempts to discover other servers, as described below. If other servers are available, it obtains the time from them as if it were a clerk node. If no other servers are available (meaning that the initializing server is the first server to be started), but the time maintainer has a battery backup clock and non-volatile memory in which $T_i$ and $I_i$ are stored (as shown in FIG. 6), the time maintainer sets its local clock to the time of the battery clock and restores $T_i$ and $I_i$ from the stored values.

If the timer maintainer does not have a battery clock, it waits either for other server nodes (such as time providers) to become available or for a command from a human operator to reset the time. In the latter case, the time maintainer simply accepts the new time without recourse to any consistency checks.

(iii) The Synchronization Algorithm for Server Nodes

Time maintainers resynchronize periodically to compensate for the drift of their local clocks and to reduce the width of their time intervals. A time maintainer determines when to synchronize by the same method used by clerks, which is described in connection with FIGS. 10-13. When resynchronizing, a time maintainer also performs the algorithm described below for detecting faulty servers and, in addition, adjusts its clock to the correct time in the same way that clerks do (see FIGS. 8-9). In contrast, time providers do not resynchronize to other servers because time providers obtain time from an external source. The inaccuracy of the time obtained by time providers is implementation specific because it depends on the hardware used to obtain the external time.

(iv) Manual Resetting of Time Maintainer Nodes

If there are no time providers on the network, there is nothing to limit the extent to which the inaccuracies of the time maintainers increase. Thus, after long periods of time (for example, on the order of weeks), the inaccuracy of a time in a network may be large (on the order of minutes). To prevent the inaccuracy from becoming undesirably large, a manual reset method exists in the preferred embodiment whereby the time can be updated by resetting the time at single time maintainer. To protect against a human operator erroneously supplying an incorrect value of time, the manual reset method requires the time interval supplied by the human operator to be contained in the local time interval of the server being reset. Thus, the manual reset method described below does not allow large changes to the current time kept by a local clock. It does, however, allow a human operator to reduce the inaccuracy of a local clock or to make small changes to the value of the clock.

Figure 16:
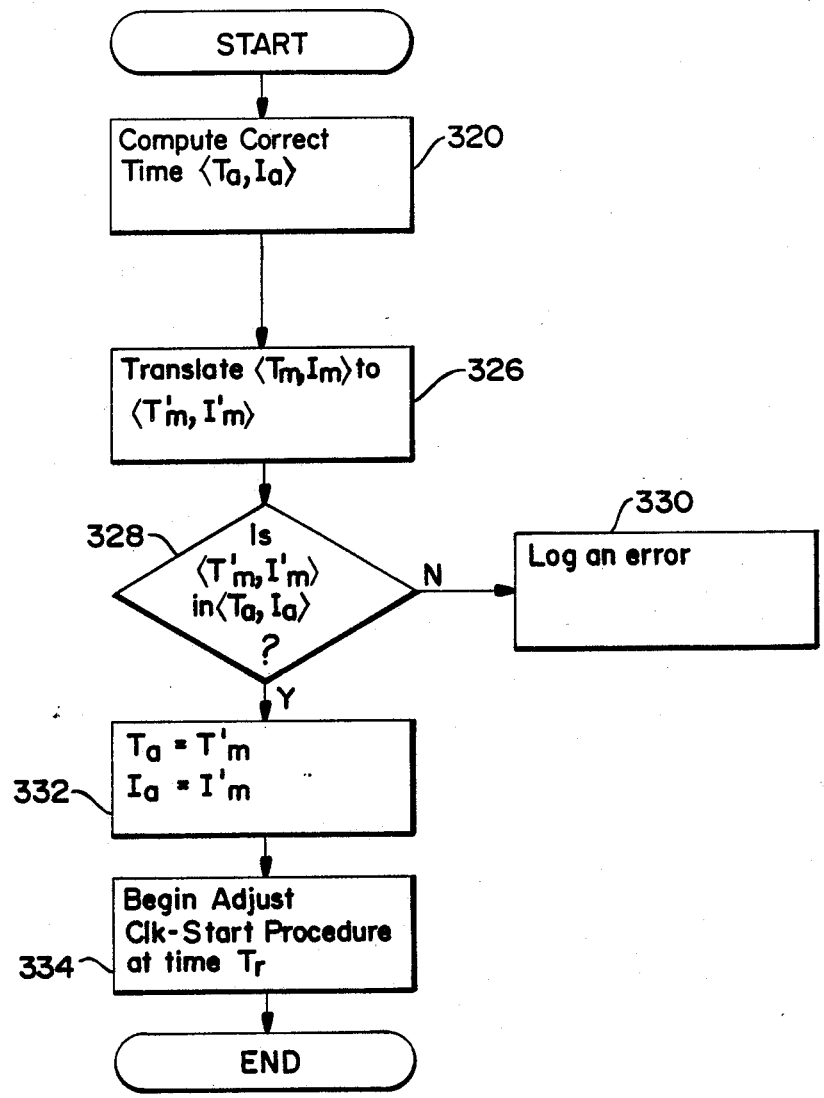
FIG. 16 is a flow chart of a preferred method of the present invention for manually resetting time maintainer nodes.

FIG. 16 shows a flow chart of the algorithm that a preferred embodiment of a time maintainer node executes in response to the receipt of manual reset request including a new time interval. The new time interval is denoted by $<T_m, I_m>$ and the time at which the manual reset request is received, as measured by the local clock, is denoted by $T_u$.

First, the correct time is computed as described in connection with FIGS. 12 and 13 (Step 320). This Step determines the actual time $<T_a, I_a>$ corresponding to the future instant at which the local clock will read $T_r$. The interval $<T_m, I_m>$, which corresponds to local time $T_u$, is translated to its equivalent value $<T_m, I_m>$, corresponding to local time $T_r$, of FIG. 12 (Step 326).

If $<T_m, I_m>$, is not contained in the interval $<T_a, I_a>$, (Step 328), the manual reset request is rejected and an error is noted (Step 330). Otherwise the request is accepted and control passes to Step 332 where $T_a$ is set to $T'_m$ and $I'_a$ is set to $I'_m$. When the local clock reads $T_r$, procedure AdjustClk_ Start shown in FIG. 8 is initiated to adjust the local clock of the time maintainer node (Step 334).

The time maintainer must complete the adjustment accomplished by the Steps shown in FIG. 16 before resynchronizing to other servers. Otherwise, the manual reset request may not take effect. It is only necessary to reset a single time maintainer. All other time maintainers will conform to the new time once they resynchronize.

When resetting the time, a human operator is expected to supply a correct inaccuracy. If no inaccuracy is supplied, a predetermined default value is used.

Human operators resetting the time must supply a correct inaccuracy to within a predetermined inaccuracy to ensure correct operation of the system.

(v) Epochs and Epoch Numbers in Server Nodes

Occasionally, the time kept by the nodes in a network is incorrect due to operator error or some catastrophic failure and not to failures in the servers themselves. When all nodes are keeping an incorrect time, it is impossible to reset the time using the manual reset request described above. Instead, it is necessary to shut down all the servers and restart them with a new, correct time interval. This process, however, may not be possible if a faulty remote server fails to shut down. To recover from this condition, the present invention employs epoch numbers which allow groups of servers to be decoupled, and which make it possible to introduce a new value of time into the distributed system by introducing it into one of the decoupled groups.

In the preferred embodiment, each server is assigned an epoch number. Servers preferably include their epoch numbers in their responses to requests for the time. Clerks always ignore this parameter. However, when a server resynchronizes or checks for faulty servers, it ignores servers with epoch numbers different from its own, as shown in Step 402 of FIG. 17, thereby decoupling that server from servers of a different epoch. A server epoch number can only be changed by a human operator. Whenever a new epoch number is assigned to a given server, that server must reinitialize according to the procedure described above. A human operator changes the epoch number at a single server and supplies it with the correct time if the server is a time maintainer node. Then, the human operator can migrate the other servers to the new (correct) epoch by changing their epoch numbers, one at a time, to correspond to that of the new epoch. As each server's epoch number is changed, it will reinitialize and obtain the correct time. To assist with the management of epoch numbers, each server notes any servers whose epoch numbers are different from its own.

(vi) Detecting Faulty Server Nodes

Preferably, server nodes periodically check to see if other server nodes are faulty but operational. The method used is to obtain the time from all available servers, compute the best correct time interval, and see if any servers do not agree with the correct time. The details of the preferred algorithm shown in the flow chart of FIG. 17.

First, the time is obtained from all available servers including the time from the clock of the server node executing the method (Step 400). Time intervals obtained from servers of a different epoch (Step 402) than the executing server node (see below) are discarded and logged (Step 404).

The correct time interval corresponding to the resynchronization time $T_r$ is computed using the algorithm presented in connection with the resynchronization of clerk nodes (FIGS. 12–13), and the value of f, representing the number of faulty servers resulting in this interval, is recorded (Step 406). If the value of f is not zero, there are faulty servers (Step 408) and an event including the identification of all servers and their respective times is logged (Step 410). If the executing server's own time interval is not contained in the computed correct interval, then the executing server is faulty (Step 412). In this case, the executing server must refrain from responding to requests for the time until it has corrected itself (Step 414). A faulty time maintainer corrects itself by adjusting its clock as described above (for clerk nodes) in FIGS. 8 and 9. A faulty timer provider attempts to correct itself by obtaining the correct time from the external reference.

Figure 17:
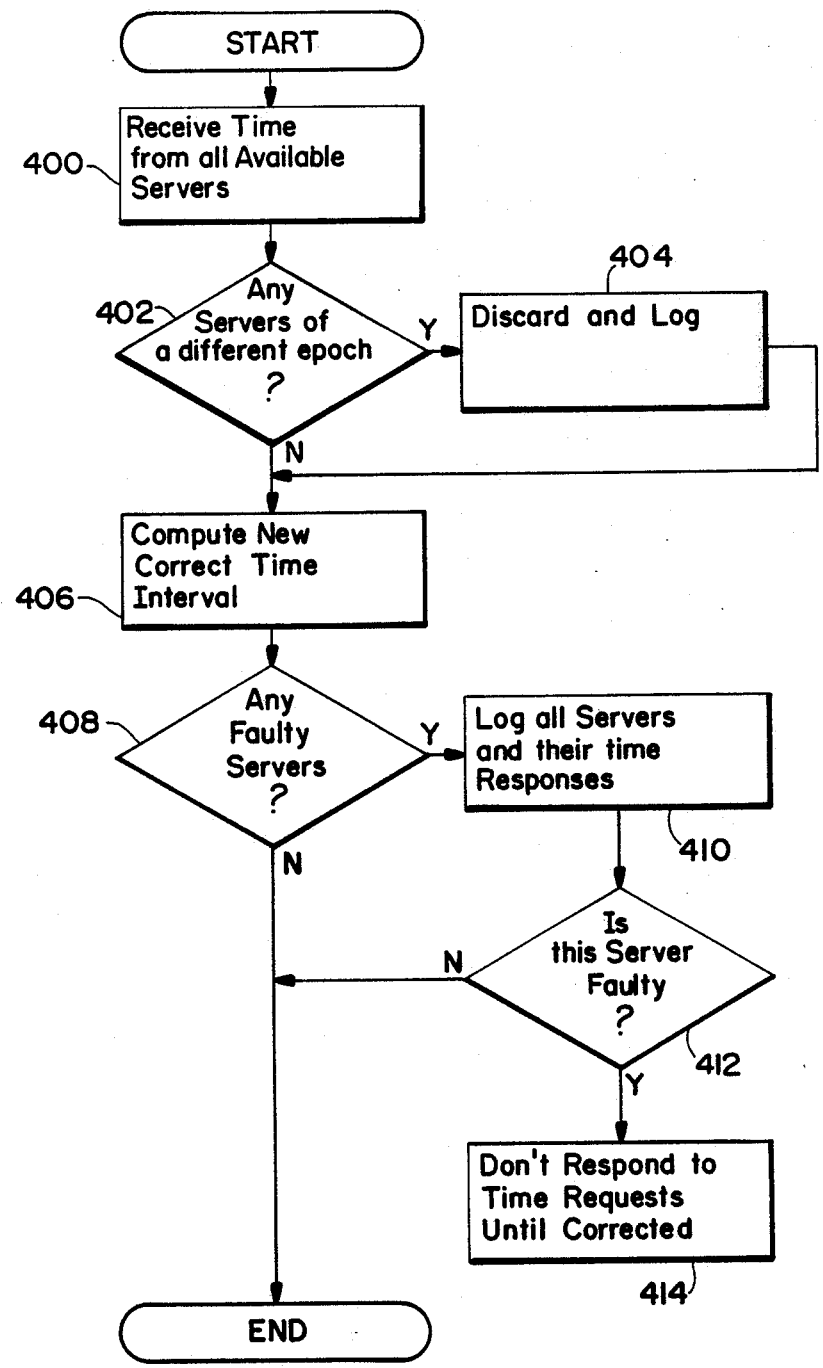
FIG. 17 is a flow chart of a preferred method of the present invention for detecting faulty server nodes.

Time maintainers preferably execute the procedure of FIG. 17 whenever they resynchronize. Time providers preferably execute the procedure at predetermined intervals.

(vii) Leap Seconds in Server Nodes

The operation of a time maintainer node to accommodate leap seconds is identical to that of clerk nodes as described above with respect to FIG. 14. In some embodiments, time providers may include a local clock which is kept correct by periodically polling a device that receives the external signal (such as a WWV receiver). For the purpose of accomodating leap seconds, such a time provider node must make adjustments for leap seconds using the method used by time maintainers and clerks. More specifically, at the time of a potential leap second as measured by $T+I$, the inaccuracy must be increased by one second by a method similar to that of FIG. 14.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. In a distributed processing system containing a plurality of interconnected nodes including a clerk node and a plurality of server nodes providing time to the system, wherein the clerk node includes a local clock having a predetermined resolution value, keeping a local time, and having an inaccuracy associated therewith representing an amount by which that local time deviates from a correct time value, a method for maintaining a correct time in the clerk node comprising the steps, performed by the clerk node, of:

requesting an updated time interval from at least one of the server nodes when the local inaccuracy of the local clock of the clerk node exceeds a predetermined maximum inaccuracy value;

noting a request time according to the local clock of the clerk node when the clerk node requests said updated time interval receiving from the server nodes respective updated time interval representations and corresponding delay values;

noting, for each receipt of said updated time interval representations and corresponding delay values, a different response time according to the local clock of the clerk node;

calculating a correct time interval from said received updated time interval representations, said received delay values, said noted request time, said noted response times, and the resolution value of the local clock of the clerk node, wherein the correct time is contained within said calculated correct time interval; and adjusting the local time kept by the local clock of the clerk node according to said calculated correct time interval.

2. The method of claim 1, further including the step of:

incrementing the local time of the local clock of the clerk node by periodically adding an incrementation value equal to the predetermined resolution value to the local time kept by the local clock, and wherein said adjusting step further includes the step of:

changing said incrementation value according to said calculated correct time interval.

3. The method of claim 2, wherein said adjusting step further includes the steps of:

calculating a duration value to determine a length of time during which said changing step is performed; and restoring said incrementation value to the predetermined resolution value when said incrementation value changing step has been performed for a length of time equal to said calculated duration value.

4. The method of claim 1, further including the step of:

calculating a resynchronization time at which the inaccuracy of the local clock of the clerk node exceeds said predetermined maximum inaccuracy value, and wherein said requesting step is performed when the local clock of the clerk node has a time substantially equal to said calculated resynchronization time.

5. The method of claim 4, further including the step of requesting an updated time interval from the server nodes when the local clock has a time substantially equal to a predetermined maximum resynchronization time.

6. The method of claim 1, wherein each server node includes a local clock keeping a local time and having an inaccuracy value associated therewith, and wherein the server nodes include time maintainer node which updates its local clock by said requesting, request time noting, receiving, response time noting, calculating, and adjusting steps used by the clerk node and a time provider node which updates its local clock by accessing an external time source, wherein said requesting step further includes the steps, performed by the clerk node, of:

requesting an updated time interval from the time maintainer node using a predetermined protocol; and requesting an updated time interval from a time provider node using said predetermined protocol.

7. The method of claim 1, wherein each server node includes a local clock keeping a local time and having an inaccuracy value associated therewith, and wherein the server nodes include a time maintainer node which updates its local clock by said requesting, request time noting, receiving, response time noting, calculating, and adjusting steps used by the clerk node and a time provider node which updates its local clock by accessing an external time source, wherein said receiving step further includes the steps, performed by said clerk node, of:

receiving an updated time interval representation and a corresponding delay value from the time maintainer node using a predetermined protocol; and receiving an updated time interval representation and corresponding delay values from the time provider node using said predetermined protocol.

8. In a distributed processing system containing a plurality of interconnected server nodes, one of which is called a time maintainer node, wherein the server nodes provide time to the system and wherein the time maintainer node includes a local clock having a predetermined resolution value, keeping a local time, and having an inaccuracy associated therewith representing an amount by which that local time deviates from a correct time value, a method for maintaining a correct time in the time maintainer node comprising the steps, performed by the time maintainer node, of:

requesting an updated time interval from at least one of the server nodes when the local inaccuracy of the local clock of the time maintainer node exceeds a predetermined maximum inaccuracy value;

noting a request time according to the local clock of the time maintainer node when the time maintainer node requests said updated time interval;

receiving from the server nodes respective updated time interval representations and corresponding delay values;

noting, for each receipt of said updated time interval representations and corresponding delay values, a different response time according to the local clock of the time maintainer node;

calculating a correct time interval from said received updated time interval representations, said received delay values, said noted request time, said noted response times, and the resolution value of the local clock of the time maintainer node, wherein the correct time is contained within said calculated correct time interval; and adjusting the local time kept by the local clock of the time maintainer node according to said calculated correct time interval.

9. The method of claim 8, further including the step of:

incrementing the local time of the local clock of the time maintainer node by periodically adding an incrementation value equal to the predetermined resolution value to the local time kept by the local clock, and wherein said adjusting step further includes the step of:

changing said incrementation value according to said calculated correct time interval.

10. The method of claim 9, wherein said adjusting step further includes the steps of:

calculating a duration value to determine a length of time during which said changing step is performed; and restoring said incrementation value to the predetermined resolution value when said incrementation value changing step has been performed for a length of time equal to the calculated duration value.

11. The method of claim 8, further including the step of:

calculating a resynchronization time at which the inaccuracy of the local clock of the time maintainer node exceeds said predetermined maximum inaccuracy value, and wherein said requesting step is performed when the local clock of the time maintainer node has a time substantially equal to said calculated resynchronization time.

12. The method of claim 8, further including the step of requesting an updated time interval from the server nodes when the local clock has a time substantially equal to a predetermined maximum resynchronization time.

13. The method of claim 8, further including the step of detecting as faulty server nodes those server nodes from which updated time interval representations outside of said calculated correct time interval are received.

14. The method of claim 8, wherein each server node includes a local clock keeping a local time and having an inaccuracy value associated therewith, and wherein the server nodes include a second time maintainer node and a time provider node which updates its local clock by accessing an external time source, wherein said requesting step further includes the steps, performed by the time maintainer node, of:
  requesting an updated time interval from the second time maintainer node using a predetermined protocol; and
  requesting an updated time interval from the time provider node using said predetermined protocol.

15. The method of claim 8, wherein each server node includes a local clock keeping a local time and having an inaccuracy value associated therewith, and wherein the server nodes include a second time maintainer node and a time provider node which updates its local clock by accessing an external time source, wherein said receiving step further includes the steps, performed by the time maintainer node of, of:
  receiving an updated time interval representation and a corresponding delay value from the second time maintainer node using a predetermined protocol; and
  receiving an updated time interval representation and corresponding delay values from the time provider node using said predetermined protocol.

16. The method of claim 8, wherein each of the server nodes possesses one of a plurality of epoch numbers identifying a group of nodes,
  wherein said time interval representation and delay value receiving step further includes the step of receiving from the server nodes the epoch numbers of the server nodes, and
  further including the step of ignoring said updated time interval representations and corresponding delay values received from a server node when said received epoch number received from the server node differs from said epoch number of the time maintainer node.

17. In a distributed processing system containing interconnected nodes including a server node and one other node, wherein the nodes include a local clock having a predetermined resolution value, keeping a local time, and having an inaccuracy associated therewith representing an amount by which that local time deviates from a correct time value, a method for maintaining a correct time in the other node comprising the steps, performed by the server node, of:
  receiving a request for an updated time interval from the other node when the local inaccuracy of the local clock of the other node exceeds a predetermined maximum inaccuracy value;
  noting a receipt time according to the local clock of the server node when the server node receives said request from the other node:
  calculating a delay value from said noted receipt time;
  calculating an updated time interval representation from the local time of the local clock of the server node and the inaccuracy of the local clock of the server node; and
  sending said updated time interval representation and said corresponding delay value to the other node.

18. The method of claim 17, wherein the server node possesses one of a plurality of epoch numbers identifying a group of nodes, and
  wherein said sending step further includes the step of sending the epoch number of the server node to the other node.

19. In a distributed processing system containing a plurality of interconnected nodes including a clerk node and a server node providing time to the system, wherein each of the nodes includes a local clock having a predetermined resolution value, keeping a local time, and having an inaccuracy associated therewith representing an amount by which that local time deviates from a correct time value, a method for maintaining a correct time in the clerk node comprising the steps of:
  requesting, by the clerk node, an updated time interval from the server node when the local inaccuracy of the local clock of the clerk node exceeds a predetermined maximum inaccuracy value;
  noting, by the clerk node, a request time according to the local clock of the clerk node when the clerk node requests said updated time interval;
  receiving, by the clerk node, from the server node an updated time interval representation and corresponding delay value;
  noting, by the clerk node, for said receipt of said updated time interval representation and corresponding delay value, a response time according to the local clock of the clerk node;
  calculating, by the clerk node, a correct time interval from said received updated time interval representation, said received delay value, said noted request time, said noted response time, and the resolution value of the local clock of the clerk node, wherein the correct time is contained within said calculated correct time interval;
  adjusting, by the clerk node, the local time kept by the local clock of the clerk node according to said calculated correct time interval;
  receiving, by the server node, said request for an updated time interval from the clerk node;
  noting, by the server node, a receipt time according to the local clock of the server node when the server node receives said request from the clerk node;
  calculating, by the server node, a delay value from said noted receipt time;
  calculating, by the server node, an updated time interval representation from the local time of the local clock of the server node and the inaccuracy of the local clock of the server node; and
  sending, by the server node, said updated time interval representation and said corresponding delay value to the clerk node.

20. The method of claim 19, wherein the server node possesses one of a plurality of epoch numbers identifying a group of nodes, and
  wherein said sending step further includes the step, performed by the server node, of sending the epoch number of the server node to the clerk node.

21. The method of claim 19, further including the step, performed by the clerk node, of: incrementing the local time of the local clock of the clerk node by periodically adding an incrementation value equal to the predetermined resolution value to the local time kept by the local clock of the clerk node, and
  wherein said adjusting step further includes the step, performed by the clerk node, of changing said incrementation value according to said calculated correct time interval.

22. The method of claim 21, wherein said adjusting step further includes the steps, performed by the clerk node, of:
calculating a duration value to determine a length of time during which said changing step is performed; and
restoring said incrementation value to the predetermined resolution value when said changing step has been performed for a length of time equal to said calculated duration value.

23. The method of claim 19, further including the step, performed by the clerk node, of calculating a resynchronization time at which the inaccuracy of the local clock of the clerk node exceeds said predetermined maximum inaccuracy value, and
wherein said requesting step is performed by the clerk node when the local clock of the clerk node has a time substantially equal to said calculated resynchronization time.

24. The method of claim 23, further including the step, performed by the clerk node, of requesting an updated time interval from the server node when the local clock of the clerk node has a time substantially equal to a predetermined maximum resynchronization time.

25. The method of claim 19, wherein the distributed processing further contains a plurality of interconnected server nodes including a time maintainer node which updates its local clock by said requesting, request time noting, receiving, response time noting, calculating, and adjusting steps used by the clerk node and a time provider node which updates its local clock by accessing an external time source, wherein said requesting step performed by the clerk node further includes the steps of:
requesting an updated time interval from the time maintainer node using a predetermined protocol; and
requesting an updated time interval from the time provider node using said predetermined protocol.

26. The method of claim 19, wherein the distributed data processing system further contains a plurality of interconnected server nodes including a time maintainer node which updates its local clock by said requesting, request time noting, receiving, response time noting, calculating, and adjusting steps used by the clerk node and a time provider node which updates its local clock by accessing an external time source, wherein said receiving step performed by the clerk node further includes the steps of:
receiving an updated time interval representation and a corresponding delay value from the time maintainer node using a predetermined protocol; and
receiving an updated time interval representation and a corresponding delay value from the time provider node using said predetermined protocol.

27. The method of claim 19, wherein the server node is a time maintainer node, wherein the distributed processing system further contains a second server node providing time to the system, and further comprising the steps, performed by the time maintainer node, of:
requesting an updated time interval from the other server node when the local inaccuracy of the local clock of the time maintainer node exceeds a predetermined maximum inaccuracy value;
noting a request time according to the local clock of the time maintainer node when the time maintainer node requests said updated time interval;
receiving from the other server node an updated time interval representation and a corresponding delay value;
noting, for said receipt of said updated time interval representation and corresponding delay value, a response time according to the local clock of the time maintainer node;
calculating a correct time interval from said received updated time interval representation, said received delay value, said noted request time, said noted response time, and the resolution value of the local clock of the time maintainer node, wherein the correct time is contained within said calculated correct time interval: and
adjusting the local time kept by the local clock of the time maintainer node according to said calculated correct time interval 28. The method of claim 27, further including the step, performed by the time maintainer node, of:
incrementing the local time of the local clock of the time maintainer node by periodically adding an incrementation value equal to the predetermined resolution value to the local time kept by the local clock, and
wherein said adjusting step performed by the time maintainer node further includes the step of changing said incrementation value according to said calculated correct time interval.

29. The method of claim 28, wherein said adjusting step performed by the time maintainer node further includes the steps of:
calculating a duration value to determine a length of time during which said changing step is performed; and
restoring said incrementation value to the predetermined resolution value when said incrementation value changing step has been performed for a length of time equal to the calculated duration value.

30. The method of claim 27, further including the step, performed by the time maintainer node, of:
calculating a resynchronization time at which the inaccuracy of the local clock of the time maintainer node exceeds said predetermined maximum inaccuracy value, and
wherein said requesting step is performed by the time maintainer node when the local clock of the time maintainer node has a time substantially equal to said calculated resynchronization time.

31. The method of claim 27, further including the step, performed by the time maintainer node, of requesting an updated time interval from the other server node when the local clock has a time substantially equal to a predetermined maximum resynchronization time.

32. The method of claim 27, further including the step, performed by the time maintainer node, of detecting as faulty server nodes those server nodes from which updated time interval representations outside of said calculated correct time interval are received.

33. The method of claim 27, wherein the other server node is a time provider node which updates its local clock by accessing an external time source, wherein the distributed processing system further contains a second time maintainer node providing time to the system, and wherein said requesting step performed by the time maintainer node further includes the steps of:
- requesting an updated time interval from the second time maintainer node using a predetermined protocol; and
- requesting an updated time interval from the time provider node using said predetermined protocol.

34. The method of claim 27, wherein the other server node is a time provider node which updates its local clock by accessing an external time source, wherein the distributed processing system further contains a second time maintainer node providing time to the system, and wherein said requesting step performed by the time maintainer node further includes the steps of:
- receiving an updated time interval representation and a corresponding delay value from the second time maintainer node using a predetermined protocol: and
- receiving an updated time interval representation and corresponding delay values from the time provider node using said predetermined protocol.

35. The method of claim 27, wherein each of the server nodes possesses one of a plurality of epoch numbers identifying a group of nodes,
- wherein said time interval representation and delay receiving step performed by the time maintainer node further includes the step of receiving from the other server nodes the epoch numbers of the server nodes, and
- further including the step of ignoring said updated time interval representations and corresponding delay values received from a server node when said received epoch number received from said server node differs from said epoch number of the time maintainer node.

36. The method of claim 19, wherein the server node is a time provider node which updates its local clock by accessing an external time source, wherein the distributed processing system further contains an other server node providing time to the system, an further including the steps, performed by the time provider node, of:
requesting an updated time interval from the other server node periodically: noting a request time according to the local clock of the time provider node when the time provider node requests said updated time interval:
- receiving from the other server node an updated time interval representation and corresponding delay value:
- noting, for said receipt of said updated time interval representation and corresponding delay value, a response time according to the local clock of the time provider node;
- calculating a correct time interval from said received updated time interval representation, said received delay value, said noted request time, said noted response time, and the resolution value of the local clock of the time provider node, wherein the correct time is contained within said calculated correct time interval; and
- detecting as faulty server nodes those server nodes from which updated time interval representations outside of said calculated correct time interval are received.

37. A clerk node in a distributed processing system containing a plurality of interconnected server nodes, the clerk node providing a correct time to an application program in the system and comprising:

a memory having a location accessible by the application program;
a local clock keeping a local time having an associated inaccuracy;
incrementing means connected to said local clock for causing said local time to increase periodically:
first processing means connected to at least one server node and responsive to a first series of instructions stored in said memory, for ensuring that said local time of said local clock is within a predetermined inaccuracy of the correct time, said processing means including:
- means for requesting an updated time interval from at least one of the server nodes when the inaccuracy of said local clock exceeds a predetermined maximum inaccuracy value,
- means for noting a request time according to said local clock when the clerk node requests said updated time interval,
- means for receiving from the server nodes respective update time interval representations and corresponding delay values,
- means for noting, for each receipt of said updated time interval representations and corresponding delay values, a different response time according to said local clock,
- means for calculating a correct time interval from said received updated time interval representations, said received delay values, said noted request time, said noted response times, and said resolution value of said local clock, wherein the correct time is contained within said calculated correct time interval, and
- means for adjusting said local time kept by said local clock according to said calculated correct time interval; and
second processing means, connected to said memory and to said local clock and responsive to a second series of instructions stored in said memory, for storing said local time kept by said local clock into the memory location accessible by the application program.

38. A time maintainer node in a distributed processing system containing a plurality of interconnected server nodes providing time information to the system, the time maintainer node maintaining a correct time and comprising:
a memory;
a local clock keeping a local time having an associated inaccuracy:
incrementing circuit means connected to said local clock for periodically; and
processing means connected to at least one server node and responsive to a series of instructions stored in said memory, for ensuring that said local time of said local clock is within a predetermined inaccuracy of the correct time, said processing means including:
- means for requesting an updated time interval from at least one of the server nodes when the inaccuracy of said local clock exceeds said predetermined maximum inaccuracy value,
- means for noting a request time according to said local clock when the time maintainer node requests said updated time interval,
- means for receiving from the server nodes respective updated time interval representations and corresponding delay values, means for noting, for each receipt of said updated time interval representations and corresponding delay values, a different response time according to said local clock, means for calculating a correct time interval from said received updated time interval representations, said received delay values, said noted request time, said noted response times, and said resolution value of said local clock, wherein the correct time is contained within said calculated correct time interval, and means for adjusting the local time kept by said local clock according to said calculated correct time interval.

39. The time maintainer node of claim 38, wherein the distributed processing system further includes a requesting node that requests an updated time interval, and wherein the time maintainer node further includes:

second processing means, connected to the requesting node and to said local clock, responsive to a second series of instructions stored in said memory, for responding to a request from the requesting node, said second processing means including:

means for receiving the request for an updated time interval from the requesting node, means for noting a receipt time according to said local clock when the time maintainer node receives the request from the requesting node, means for calculating a delay value from said noted receipt time, means for calculating an updated time interval representation from the local time of said local clock and the inaccuracy of said local clock, and means for sending said updated time interval representation and said corresponding delay value to the requesting node.

40. The time maintainer node of claim 39, wherein said time maintainer node possesses one of a plurality of epoch numbers identifying a group of nodes, and wherein said second processing means further includes means for sending the epoch number of the time maintainer node to the requesting node.

41. A time provider node in a distributed processing system containing a plurality of interconnected server nodes, the time provider node maintaining a correct time and comprising:

a memory;

a local clock keeping a local time having an associated inaccuracy;

increment circuit means connected to said local clock for causing said local time to increase periodically;

external time source interface means for receiving an external time value from an external time source;

means, connected to the external time source interface means and executing instructions stored in the memory, for ascertaining an inaccuracy of the external time source;

means, connected to the ascertaining means and executing instructions stored in the memory, for calculating a correct time, including the external time value and an interval reflecting the inaccuracy of the external time source, from said external time value and said inaccuracy of said external time source; and means connected to said calculating means and executing instructions stored in the memory for adjusting the local time kept by said local clock according to said calculated correct time.

42. The time provider node of claim 41, wherein the distributed processing system further includes a requesting node that requests an updated time interval, wherein the time provider node further includes:

second processing means connected to said local clock and to the requesting node, responsive to instructions stored in said memory, for responding to the request for an updated time interval, said second processing means including:

means for receiving the request for an updated time interval from the requesting node, means for noting a receipt time according to said local clock when the time provider node receives said request from the requesting node, means for calculating a delay value from said noted receipt time, means for calculating an updated time interval representation from the local time of said local clock and the inaccuracy of the local clock, and means for sending said calculated updated time interval representation and said corresponding delay value to the requesting node.

43. The time provider node of claim 42, wherein the time provider node possesses one of a plurality of epoch numbers identifying a group of nodes, and wherein said second processing means further includes means for sending the epoch number of the time provider node to the requesting node.

* * * * *

UNITED STATES PATENT AND TRADEMARK OFFICE
CERTIFICATE OF CORRECTION

PATENT NO. : 4,894,846

DATED : January 16, 1990

INVENTOR(S) : Michael Fine

It is certified that error appears in the above-identified patent and that said Letters Patent is hereby corrected as shown below:

Claim 1, column 18, line 47, "interval" should be followed by --;--.

Claim 3, column 19, line 10, change ":" to --;--.

Claim 17, column 21, line 60, change ":" to --;--.

Claim 21, column 22, line 62, "incrementing" should begin the next line, indented.

Claim 27, column 24, line 17, change ":" to --;--.

Claim 27, column 24, line 20, "interval" should be followed by --.--.

Claim 35, column 25, line 26, "receiving" should be preceded by --value--.

Claim 36, column 25, line 40, change "an" to --and--.

Claim 36, column 25, line 42, "requesting" should be indented.

UNITED STATES PATENT AND TRADEMARK OFFICE
CERTIFICATE OF CORRECTION

PATENT NO. : 4,894,846
DATED : January 16, 1990
INVENTOR(S) : Michael Fine

It is certified that error appears in the above-identified patent and that said Letters Patent is hereby corrected as shown below:

Claim 36, column 25, line 43, change ":" to --;--.

Claim 36, column 25, line 43, "noting" should begin the next line, indented.

Claim 36, column 25, line 46, change ":" to --;--.

Claim 36, column 25, line 49, change ":" to --;--.

Claim 37, column 26, line 6, ":" should be --;--.

Claim 37, column 26, line 21, change "update" to --updated--.

UNITED STATES PATENT AND TRADEMARK OFFICE
CERTIFICATE OF CORRECTION

PATENT NO. : 4,894,846

DATED : January 16, 1990

INVENTOR(S) : Michael Fine

It is certified that error appears in the above-identified patent and that said Letters Patent is hereby corrected as shown below:

Claim 38, column 26, line 52, "for" should be followed by --causing said local time of said local clock to increase--.

Signed and Sealed this

Thirtieth Day of July, 1991

*Attest:*

HARRY F. MANBECK, JR.

*Attesting Officer*     *Commissioner of Patents and Trademarks*